United States Patent [19]
Satoh et al.

[11] Patent Number: 5,555,389
[45] Date of Patent: Sep. 10, 1996

[54] STORAGE CONTROLLER FOR PERFORMING DUMP PROCESSING

[75] Inventors: Takao Satoh; Akira Yamamoto, both of Sagamihara; Shigeo Honma, Odawara, all of Japan

[73] Assignee: Hitachi, Ltd., Tokyo, Japan

[21] Appl. No.: 270,831

[22] Filed: Jul. 5, 1994

[30] Foreign Application Priority Data

Jul. 7, 1993 [JP] Japan ................... 5-168112

[51] Int. Cl.⁶ ................................. G06F 13/00
[52] U.S. Cl. .............. 395/427; 395/182.11; 395/182.03; 395/600; 395/650; 364/DIG. 1; 364/238.4; 364/268.5; 364/282.1
[58] Field of Search ................... 395/600, 425, 395/650, 182.11, 600, 650, 427, 182.03; 364/DIG. 1

[56] References Cited

U.S. PATENT DOCUMENTS

| | | | |
|---|---|---|---|
| 4,618,926 | 10/1986 | Kubo et al. | 364/200 |
| 5,109,336 | 4/1992 | Guenther et al. | 395/425 |
| 5,193,171 | 3/1993 | Shinmura et al. | 395/425 |
| 5,252,812 | 10/1993 | Nakamura | 235/380 |
| 5,377,353 | 12/1994 | Yamaguchi | 395/650 |

FOREIGN PATENT DOCUMENTS

| | | |
|---|---|---|
| 57-90770 | 6/1982 | Japan . |
| 62-293355 | 12/1987 | Japan . |
| 1-231150 | 9/1989 | Japan . |

*Primary Examiner*—Thomas G. Black
*Assistant Examiner*—Jean R. Homere
*Attorney, Agent, or Firm*—Fay, Sharpe, Beall, Fagan, Minnich & McKee

[57] ABSTRACT

A storage controller for controlling a storage device storing a plurality of data records and a dump process executed by using this storage device, the storage controller, before a dump process, setting data records to be dumped in a generation fixed status in response to a request from the processor, and when an update request is made on a data record set in a generation fixed status, stores a before-update data record as a generation fixed data record in an unused area of the storage device or in a cache memory or the like before starting an update process, and when receiving a data record read request for the dump process from the processor, examining the presence of a stored generation fixed data record corresponding to the data record specified by the request, and if there is the corresponding generation fixed data record, transferring the data record to the processor in reply to the read request.

24 Claims, 30 Drawing Sheets

FIG. 3

GENERATION CONTROL TABLE 312

| 3121 | 3122 | 3123 | 3124 | 3125 | 3126 |
|---|---|---|---|---|---|
| DISK NUMBER | HOST NUMBER | GENERATION NUMBER | STARTING DATA RECORD ADDRESS | ENDING DATA RECORD ADDRESS | DATE |
|  |  |  |  |  |  |
|  |  |  |  |  |  |
|  |  |  |  |  |  |
|  |  |  |  |  |  |

SLOT CONTROL BLOCK (SCB) 3165

FIG. 17

GENERATION CONTROL TABLE 312

| DISK DRIVE NUMBER | HOST NUMBER | GENERATION NUMBER | STARTING DATA RECORD ADDRESS | ENDING DATA RECORD ADDRESS | DATE | SCB POINTER |
|---|---|---|---|---|---|---|
| 3121 | 3122 | 3123 | 3124 | 3125 | 3126 | 3127 |
|  |  |  |  |  |  |  |
|  |  |  |  |  |  |  |
|  |  |  |  |  |  |  |
|  |  |  |  |  |  |  |

FIG. 24

GENERATION CONTROL TABLE 312

| DISK DRIVE NUMBER 3121 | HOST NUMBER 3122 | GENERATION NUMBER 3123 | STARTING DATA RECORD ADDRESS 3124 | ENDING DATA RECORD ADDRESS 3125 | DATE 3126 | SCB POINTER 3127 | CACHE MEMORY CAPACITY 3128 |
|---|---|---|---|---|---|---|---|
| | | | | | | | |
| | | | | | | | |
| | | | | ......... | | | |
| | | | | | | | |

5,555,389

STORAGE CONTROLLER FOR PERFORMING DUMP PROCESSING

BACKGROUND OF THE INVENTION

This invention relates to a storage controller and a control method for controlling storage devices of a computer system. More particularly, this invention relates to a storage controller which has a function to collect complete information to be dumped at the start time of a dump process even when this dump process of data records on the storage device is performed in concurrence with another job, and also relates to a method of the dump process.

In operating a computer system, in order to maintain the reliability of data records stored in the external storage device by a system-wise data integrity protection, such as by using magnetic disk units, it is generally practiced to copy, in other words, dump data records to another recording medium, like a magnetic tape.

Various techniques have been proposed aimed at decreasing the amount of records to be handled in a dump process or improving the performance of the dump process. For example, in a system revealed in JP-A-57-90770, the disk control unit records information about the location of an updated data record on the disk unit into a control memory in the disk controller. A dump program which runs on the central processing unit, before dumping the data records on the disk unit, reads information about the locations of updated data records stored in the control memory. After this, the dump program reads only updated data records from the disk unit according to the information about the locations of updated data record, and writes them on another recording medium. Under this arrangement, only updated data records are dumped by the dump process, so that the number of data records subject to the dump process can be reduced.

A system such as this has a problem that other jobs cannot be executed until a dump process is completed. The reason is that if a data record is updated during execution of another job, there is a possibility that this updating is looked over and the new data is not dumped.

As a technique for solving this problem, there is a system disclosed in JP-A-1-231150. In this system, there are two kinds of data record location information: a first identification information is used to show the locations of data records updated on the time base, and a second identification information is used to show the locations of data records updated while a dump process is in progress. Accordingly, it is possible to identify data records which are updated while a dump process is being executed, and specify those data records as being subject to the next dump process. Consequently, data records which are updated in concurrence with or in the intervals of ordinary data processing can be dumped without omission.

On the other hand, as a technique for improving the performance and the reliability of the storage system, there is a disk array system disclosed in JP-A-62-293355. In this system, a method is adopted that a plurality of parity segments are generated from a plurality of data records, and data records in a set corresponding to a parity record are stored in different storage devices, and parity records corresponding to data records of all sets are arranged such that they are not in the possession of a storage device. In a system using a control method mentioned above, when a data record is updated, the parity record, too, needs to be updated. An adopted method for updating a data record is to generate a modification mask from an old data record and a new data record, then read a parity record from the storage device, further generate a new parity record by the read-out parity record and the modification mask, and write the new parity record back to the storage device.

In JP-A-1-231150 mentioned above, because data records to be dumped are limited to updated data records, it is possible to reduce the amount of data to be handled in the dump process, and execute the dump process and another job concurrently. Therefore, the dump process can be executed in a short time without interrupting the online operations. However, in this system, as described above, complete information to be dumped at a given time cannot be collected. To be more specific, for a time from the start of the dump process until data records have been actually dumped to the processor, if an update request is made on a certain data record, the completeness of information on the data records at the start time of the dump process will lost.

Meanwhile, in the disk array system, a plurality of parity records are generated from a plurality of parity records, and the thus generated parity records are dispersed into a plurality of storage devices to ensure the reliability of data records and cut down the overhead required for the improvement of reliability. By this arrangement, the reliability can be increased against hardware faults in the storage system. However, preventive measures against operation errors of the user are not provided. Even in the disk array system such as this, the dump process is indispensable, and the same problem as in JP-A-1-231150 arises.

SUMMARY OF THE INVENTION

An object of the present invention is to provide a storage controller and a dump method for collecting complete information to be dumped at the start time of the dump process even when the dump process is executed in concurrence with another job.

In order to achieve the above object, a storage controller according to the present invention for controlling the storage device to store a plurality of data records comprises means for storing an old data record by writing in a predetermined storing means when a data record is specified as undergoing a dump process and an update request is made on the specified data record during the dump process, and means for transferring the data record to a processor in response to a data read request issued by a dump program executed on the processor if there is the data record, which corresponds to the data record specified by the read request, in the data records stored in the predetermined storing means. In order to transfer a saved data record in response to a read request, there is further provided means for associating a data record updated in response to the update request with the old data record saved in the predetermined storing means.

A storage controller according to the present invention, to be more concrete, comprises generation fixing means for putting data records in a generation fixed status by adding a generation number for uniquely identifying a time of the generation fix process performed on a specified range of data records in response to an external generation fix request specifying a range of data records to be fixed, deciding means for deciding whether or not a generation has been fixed on a data record on which an update request is made by referring to the generation fixing means in response to an external data record update request, old data record copying means for copying a data record to be updated to an unused area in the storage device along with its fixed generation when the deciding means makes a decision that a generation has been fixed on the data to be updated, and means for storing in the storage device a data record transferred here from outside by the data record update request.

According to another aspect of the present invention, another storage device is provided in addition to the storage device in which data records are stored, and the old data record copying means copies a data record to be updated to this other storage device.

According to yet another aspect of the present invention, in the storage controller, there is provided a cache memory for holding copies of some of data records stored in the storage device, and the old data record copying means copies a data record to be updated to the cache memory.

By using the storage controller described above, in the dump process according to the present invention, operations are carried out as follows.

Before the dump process to dump data from the storage device, the dump program which runs on the processor specifies to the storage controller data records to undergo the dump process. By way of the above specification, the processor issues a generation fix request including a range of data records subject to the dump process and a generation number as parameters. On receiving this generation fix request, the storage controller causes the control memory to hold the range of data records and the generation specified by the generation fixing means, and thus sets the data records in a generation fixed status.

After the generation has been fixed as described, when a program running in concurrence with the dump program issues a data record update request, the storage controller checks by means of the deciding means whether or not the data record to be updated is within the range of generation fixed data records. If the decision is that the data record to be updated is within the range of generation fixed data records, while the data record yet to be updated by the update request is associated with a generation the storing means stores the old data record, in an unused area in the storage device, or in another storage device other than the storage device where the data records are already stored or in the cache memory in the storage controller. Therefore, the data records as at the start time of a dump process can be held as generation fixed data records, and even if, after the dump process is started, an updated request is made on a data record in the specified range of data records for the dump process and the data record is updated, the data records at the start time of the dump process can be securely transferred to the processor. A new, or updated data record is stored in the location at the address of the old data record, and therefore the address relation of the updated data record with other data records remains unchanged. As a result, even if a series of data records, including updated data records, is read one after another, a wasteful seek does not occur.

By arranging to store the old data record in the cache memory in the storage controller, the storage device need not be accessed when an old data record is to be stored, and overhead in updating a data record can be reduced. When there is not a sufficient cache memory capacity, if an arrangement is made such that an old data record in the cache memory, which is to be updated, is written into the storage device at a specified timing, the cache memory can be used effectively. If this writing into the storage device is executed asynchronously with the execution of a data record update request from the processor, there is no delay in response time to a data record update request.

BRIEF DESCRIPTION OF THE DRAWINGS

FIG. 3 is a generation control table;

FIG. 17 is a diagram showing a generation control table in the second embodiment;

FIG. 24 is a diagram of a generation control table in a fourth embodiment;

DESCRIPTION OF THE PREFERRED EMBODIMENTS

Figure 1:
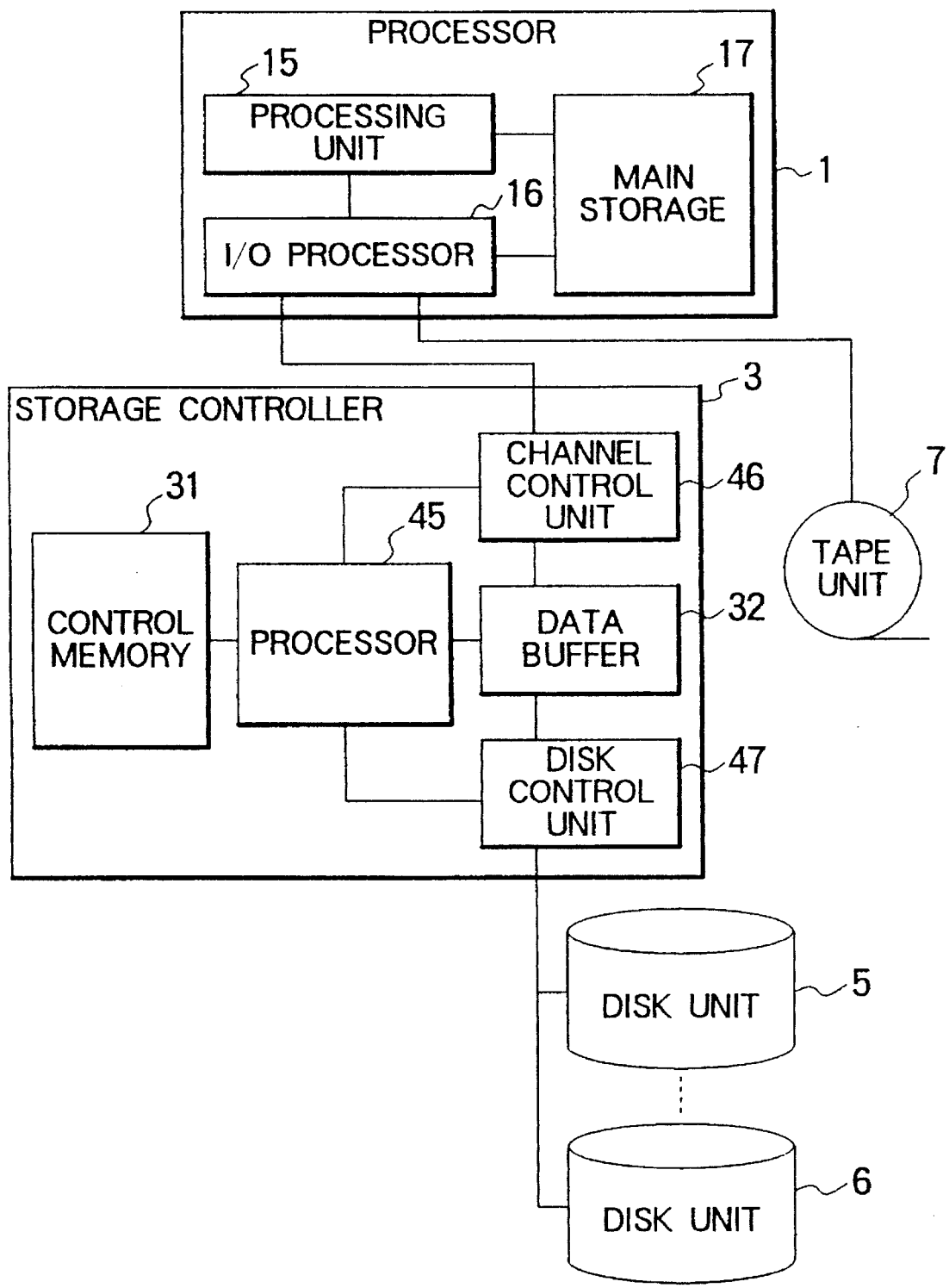
FIG. 1 is a block diagram showing a hardware structure of a computer system according to a first embodiment of the invention.

FIG. 1 is a block diagram showing a hardware structure of a computer system having a storage controller according to an embodiment of the present invention. This computer system comprises a processor 1, a storage controller 3, a plurality of disk units 5, 6 controlled by the storage controller 3, and a tape unit 7. The processor 1 includes a processing unit 15, a main storage 17, and an I/O processor. The processor 1 is connected through the storage controller to the disk units 5, 6. The storage controller 3 includes a control memory 31 made nonvolatile by a battery, a data buffer 32 for temporarily storing a data record transferred between the processor 1 and the disk unit 5, a channel control circuit 46 for controlling the transfer of data between the processor 1 and the data buffer 32, a disk control unit 47 for controlling the transfer of data between the data buffer 32 and the disk units 5, 6, and a control processor 45 for controlling the above-mentioned control circuits. The data buffer 32 has a capacity of several megabytes in this embodiment.

Figure 2:
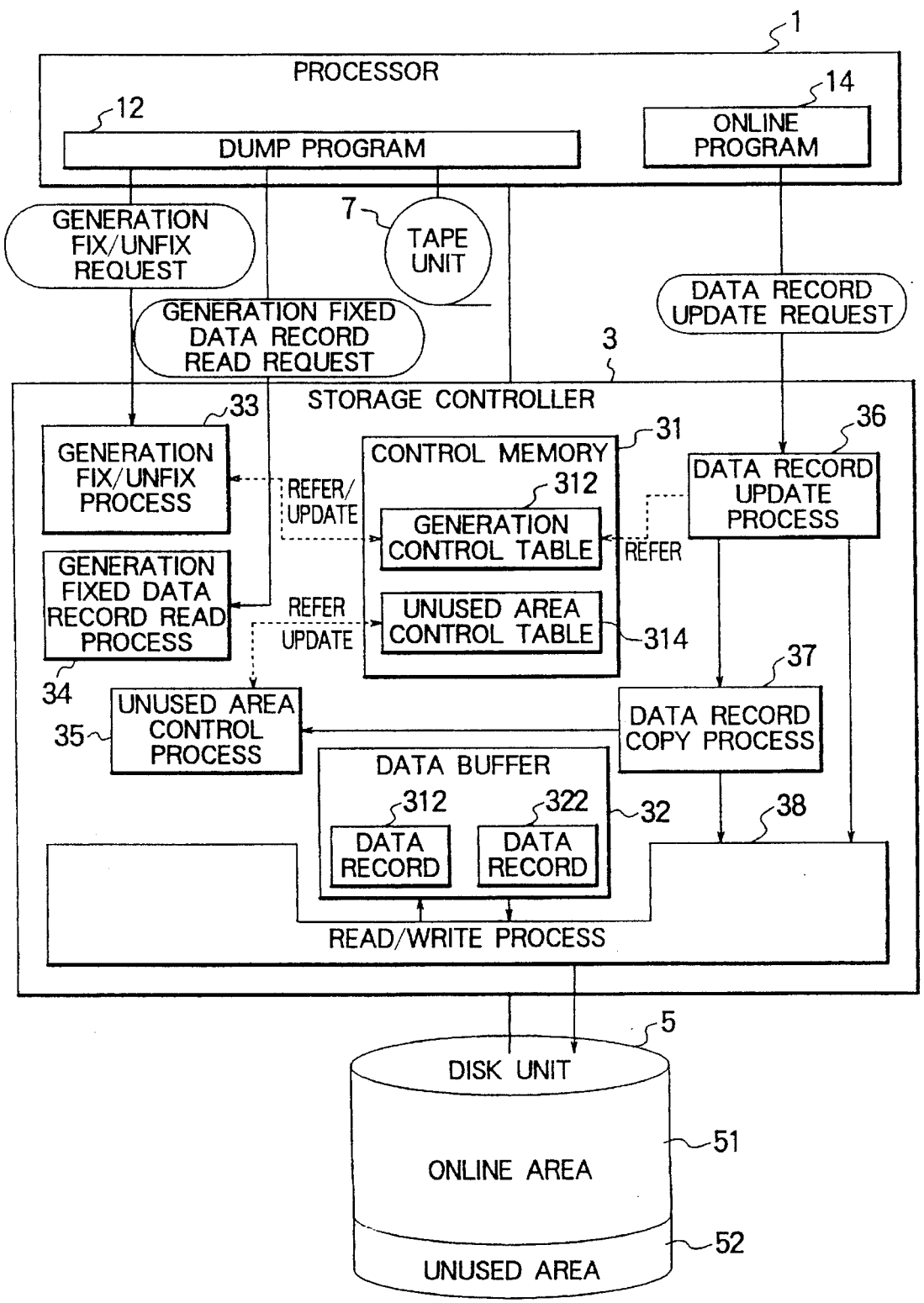
FIG. 2 is a block diagram showing a logical structure of the computer system according to the first embodiment.

FIG. 2 is a block diagram showing a logical structure of the computer system shown in FIG. 1. On the processor 1, an online program 14 for online processing or the like and a dump program 13 for dumping data records from a disk unit 5 to a tape unit 7 to preserve a backup copy are executed by a processing unit 15. The dump program 13, when it executes a dump process, issues a generation fix request, a generation unfix request, and a generation fixed data record read request to the storage controller 3 at timing which will be described later. The online program 14, while it carries on processing, issues a data record update request to the storage controller 3 as the occasion demands. The dump program 12 and the online program can operate concurrently.

The control processor 45 in the storage controller 3 executes a processing program to support the dump process in addition to a control program to access the disk unit 5.

The processes executed by the processing program include a generation fix/unfix process 33, a generation fixed data record read process 34, an unused area control process 35, a data record update process 36, a data record copy process 37, and a read/write process 38. The control memory 31 stores a generation control table 312 and an unused area control table 314 which are referenced or updated by the processing program which supports the dump-related processes mentioned above. In this embodiment, the storage area of the disk unit 5 is divided into an online storage area 51 on which the online program 14 reads and writes data records, and an unused area 52 other than the online storage area 51. The unused area 52 means storage areas at cylinder boundaries, and is controlled by an unused area control table 314. In this embodiment, the unused area 52 is used to hold a data record yet to be updated when an update request is made on a data record set in a generation-fixed status to be ready for a dump process. Hereafter, old data records stored in the unused area 51 are referred to as generation fixed data records.

The generation control table 312 has a plurality of entries as shown in FIG. 3. Each entry is made in response to a generation fix request issued by the processor 1 in order to enter generation status information regarding each generation fix request. In this embodiment, the items of generation status information include the disk number of a disk unit on which a generation fixed status is set, the host number of the processor which issued a generation fix request, the generation number of a generation fix request, the address of the first data record in a range of data records on which a generation fixed status is set, the address of the last data record in the range of data records on which a generation fixed status is set, and time at which the generation fix request was accepted. Those items of generation status information are entered in entry fields 3121 to 3126. The generation number serves as an identifier for uniquely identifying individual generation fix requests issued by the processor 1. Therefore, by having a generation fixed data record associated with the generation number, it is possible to know by which generation fix request issued on what date a given generation fixed data record was set in a generation fixed status. Taking a different point of view, by the generation number associated with the generation fixed data record, that generation fixed data record can be identified as a data record to be subjected to a dump process started at what point in time.

Figure 4A:
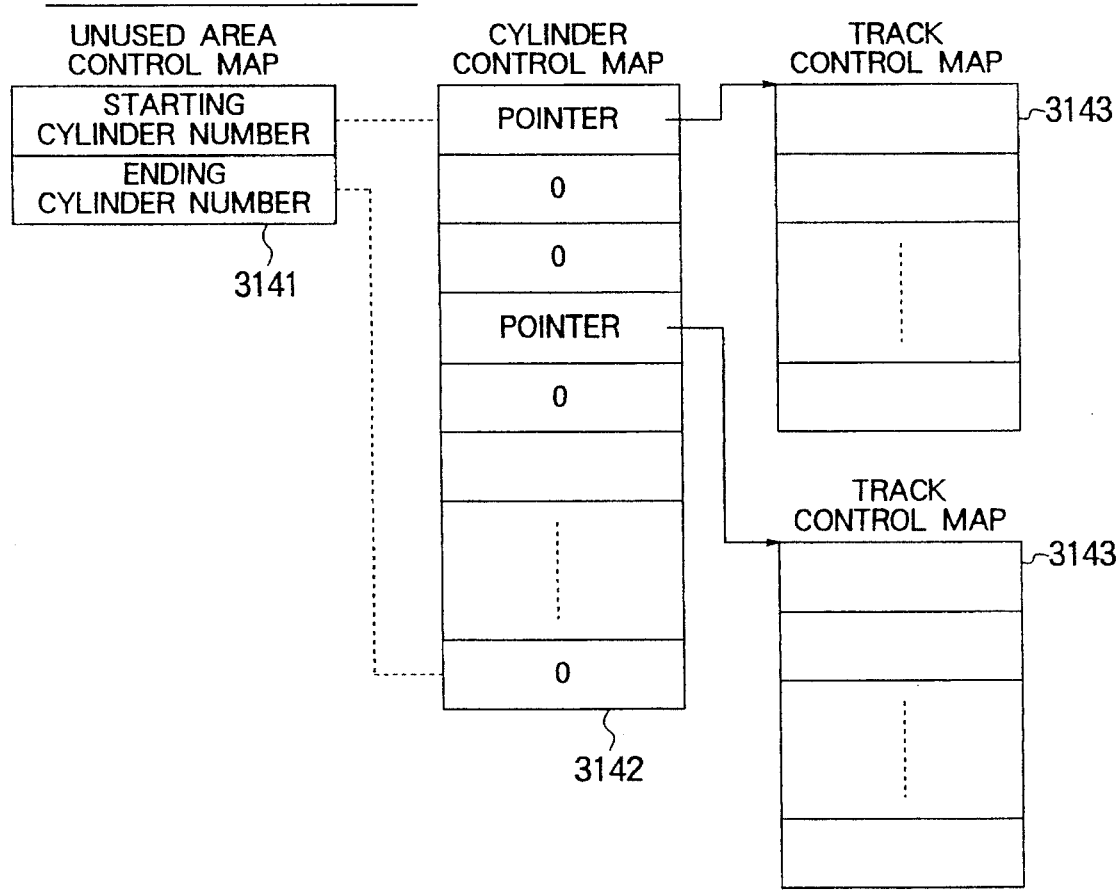
FIG. 4a is a diagram showing an unused area control table.
Figure 4B:
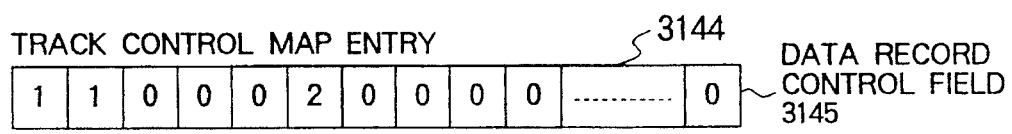
FIG. 4b is a diagram showing an entry on a track table in the unused area control table.

The unused area control table 314, as shown in FIG. 4a, includes an unused area control map 3141 for controlling a starting cylinder address and an ending cylinder address of the unused area 51 on the disk unit 5, a cylinder control map for controlling the status of use of each cylinder of the unused area 51, and a track map 3143 for controlling the status of use of tracks constituting a cylinder. The respective entries of the cylinder control mad 3142 correspond to the cylinders of the unused area 51, and pointer information provides addresses of the track control maps 3143 for controlling the tracks in the respective cylinders, the track control maps being included in the control memory. FIG. 4a shows the cylinders corresponding to the entries of "0" in the cylinder control map 3142 have all tracks in unused status. As shown in FIG. 4b, each entry 3144 of the track control map 3143 includes data record control fields 3145 for controlling the status of use of the storage area to store generation fixed data records. In the data record control fields 3145, the generation numbers of the generation fixed data records stored in the corresponding storage areas are entered. Among the data record control fields 3145, for the fields which have "0" entered, the corresponding storage areas are in the unused status.

Figure 5:
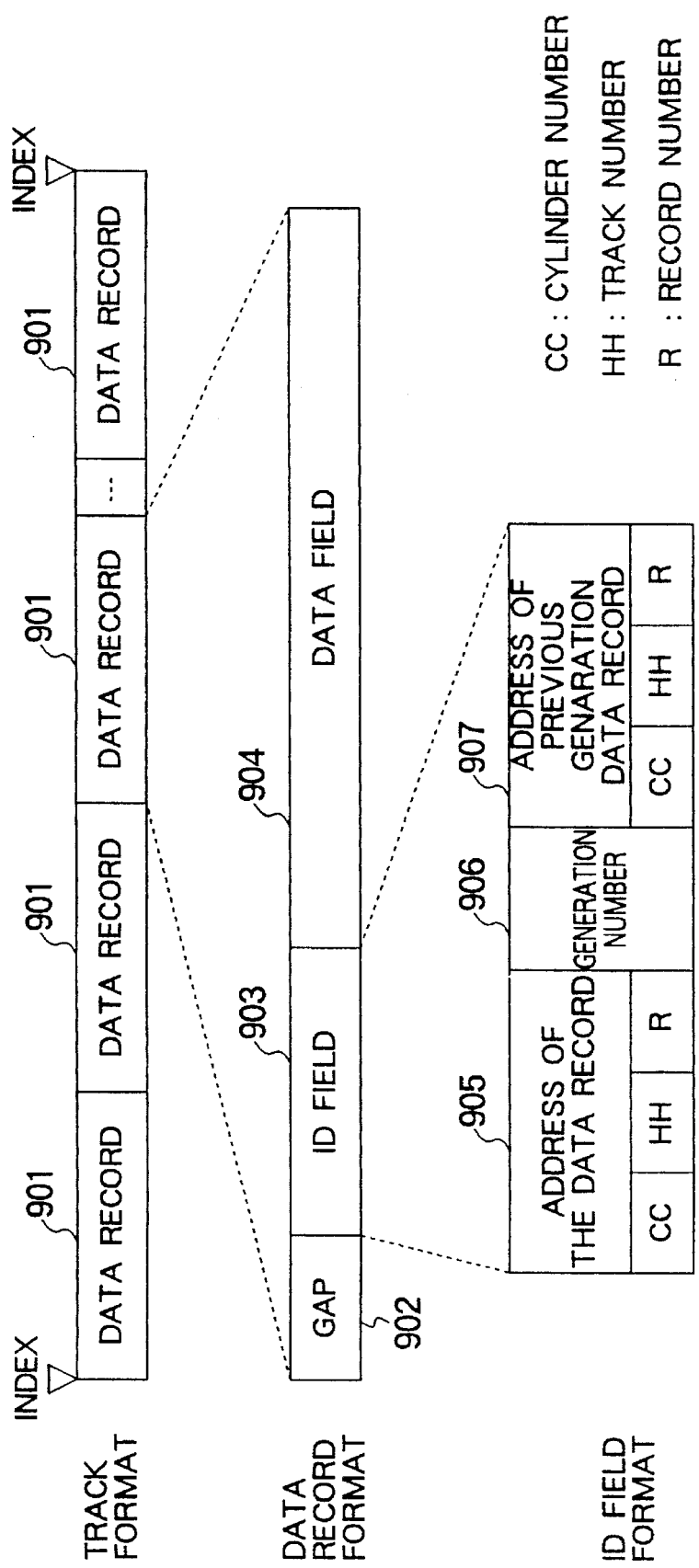
FIG. 5 shows formats of a track and a data record on the disk unit.

FIG. 5 shows a track format on the disk unit 5. Each track on the disk unit 5 has its start point indicated by an INDEX, and stores a plurality of data records 901. On the track, the data records are separated from one another by GAPs 902, and each data record includes an ID field 903 for storing control information, and a DATA field 904 for storing data transferred here from the processor 1. The ID field 903 storing control information on a data record 901 has a data record address, including a cylinder address CC, a track address HH, and a record number R, used to identify the data record. If the data record is a generation fixed data record, a generation 906 is set. When the data record is to be read, if there are data records with a plurality of generations, address 907 indicating the storage area of a previous generation data record address is stored in the ID field.

Description will now be made of the dump process in the computer system described above.

Figure 6:
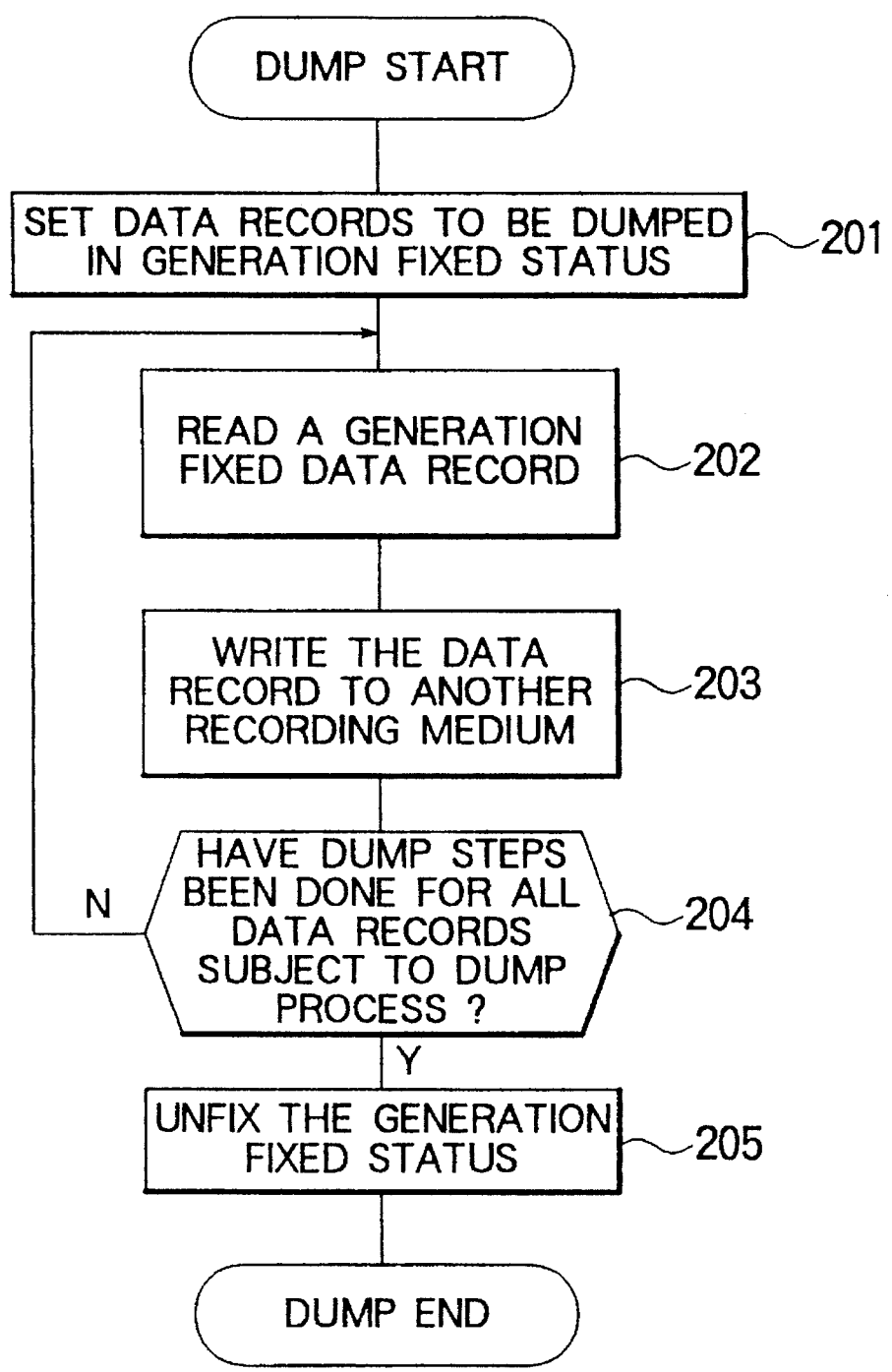
FIG. 6 is a flowchart of a dump program.

FIG. 6 is a flowchart of a process executed by a dump program 12 which runs on the processor 1. Before proceeding with the dump process, the dump program 12 executes a process for setting data records of the range subject to the dump process in a generation fixed status (step 201). This process is carried out by the dump program issuing to the storage controller 3 a generation fix request (command) including a generation fix range and a generation number as parameters. The generation fix request includes as parameters a range of data records to be put in a generation fixed status, in other words, the first and last data record addresses for setting data records in a generation fixed status, and also includes a generation number. On receiving a generation fix request, the storage controller 3 executes a generation fix/unfix process 33, and sets the specified data records in a generation fixed status. When the processor 1 issues an update request on the generation fixed data record to the storage controller 3, the storage controller 3, after storing the old data record in the unused area 52 on the disk unit 5, executes an update process. The dump program 12, after executing the generation fix process at step 201, reads a data record in a range of data records which have been set in a generation fixed status (step 202). At step 202, to read a data record, a generation fixed data record read command is issued to the storage controller 3. The parameters of this command are an address of a data record to be read and a generation number. When receiving this command, the storage controller 3 transfers data records of the specified generation to the processor 1. Therefore, even if any data record subject to the dump process is updated during the dump process, data records stored in the disk unit at the start time of the dump process can be obtained. A data record transferred from the storage controller 3 at step 202 is written in another recording medium, that is, in the tape unit 7 at step 203. At step 204, a decision is made whether or not steps 202 and 203 have been done, in other words, whether or not a dump process has been done for all data records subject to the dump process. If a decision is made at step 204 that all data records subject to the dump process have been processed, the data records in the range subject to the dump process, which were set in the generation fixed status at the start time of the dump process, are set again in the generation unfixed status at step 205. This unfixing of generation is done by issuing a generation unfix command to the storage controller 3. On receiving this generation unfix command, the storage controller 3 sets the data records in a generation unfixed status.

The flow of the steps carried out by the dump program 12 has been described. Description will then be made of the processes executed by the storage controller 3 after the dump program 12 issues a generation fix command until the generation fixed data records are set in a generation unfixed status.

When receiving a generation fix command issued at step 201 of the process by the dump program 12, the storage controller 3 executes a generation fix/unfix process 33. In the generation fix/unfix process 33, both fixing and unfixing of a generation are carried out. Fixing a generation will first be described here and unfixing a generation will be described later.

Figure 7:
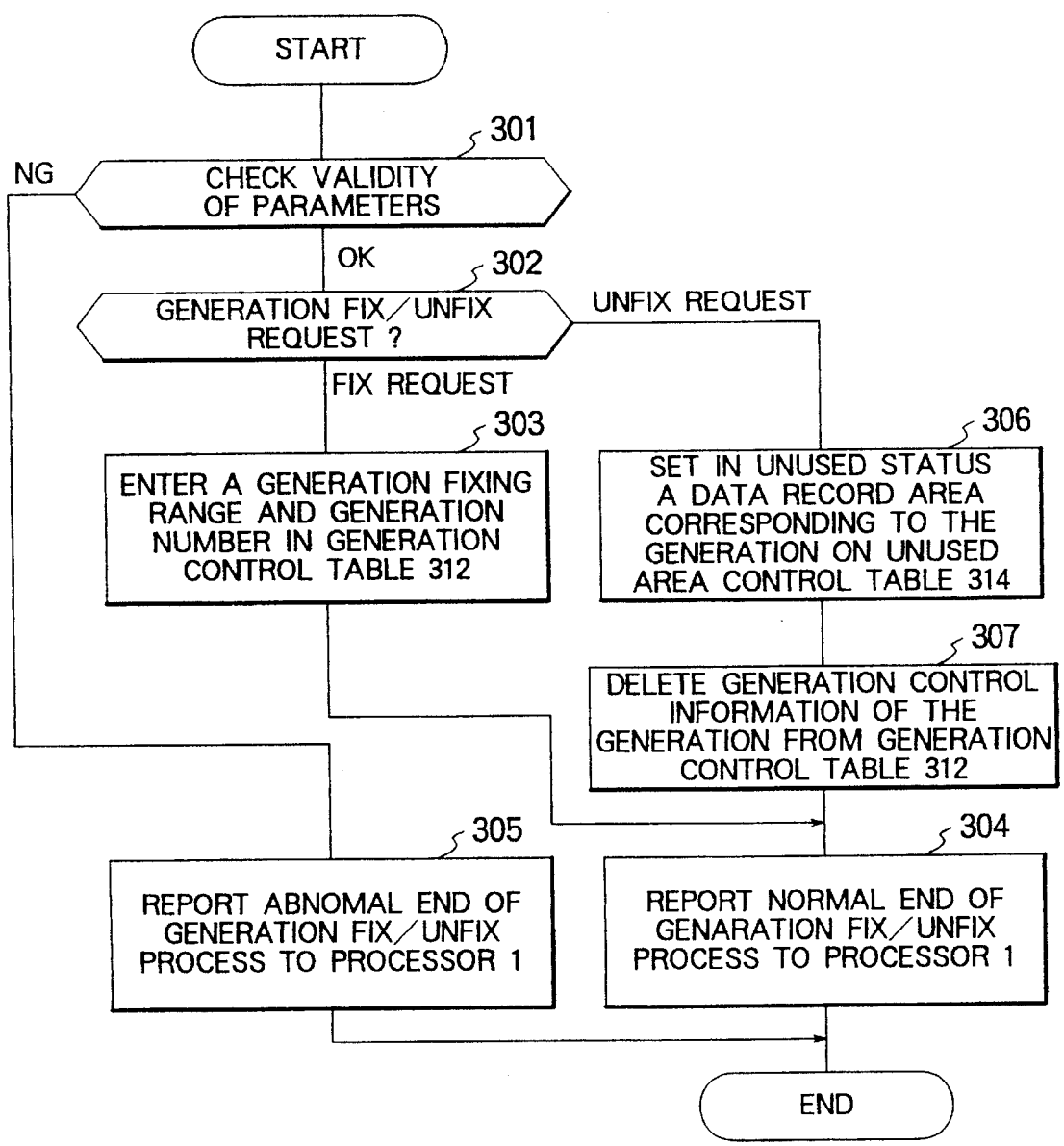
FIG. 7 is a flowchart of a generation fix/unfix process.

As shown in FIG. 7, the generation fix/unfix process 33 checks the validity of the parameters specified by the processor 1 (step 301). As the result of the check at step 301, if any contradiction is found in the parameters, an abnormal end of the generation fix/unfix process is reported to the processor 1 at step 305, the process is terminated. If the parameters are found valid at step 301, the process proceeds to step 302 where a decision is made on the kind of request, that is, whether the command from the processor 1 requests that a generation be fixed or unfixed. Since in this case the command from the processor 1 is to request that a generation be fixed, at step 303 a range of fixing a generation and a generation number are entered in the generation control table 312 on the control memory 31. To be concrete, at step 303, a disk unit storing data records specified as a generation fixing range, that is, a disk number for identifying a disk unit subject to a generation fix process is entered in a field 3121, a host number for identifying a processor which has issued the generation fix request is entered in a field 3122, a generation number given as a parameter in the generation fix request is entered in a field 3123, and the first and last data records of the range subject to the generation fix process, given as parameters, are entered in fields 3124, 3125. In a field 3126, a date on which the generation fix command from the processor 1 is received is entered. After generation status information is placed in the generation control table 302, at step 304 a normal completion of the generation fix/unfix process is reported to the processor 1, with which the process is completed.

While the generation fix process is in progress, access to data records in the range subject to the dump process is prohibited, but the generation fix process is executed only on the control memory in the storage controller and therefore can be finished in a short time. Hence, the prohibition of access to data records during the generation fix process causes no substantial problem.

After data records subject to the dump process are set in a generation fixed status, the processor 1 issues a generation fixed data record read request, reads those data records, and copies them to the tape unit 7. In this embodiment, as described above, in the processor 1, the dump program 12 and the online program 14 can operate concurrently, and therefore a data record update request is liable to occur during the dump process. For the convenience of description, before describing the processes performed by the storage controller 3 in response to a generation fixed data record read request, description will first be made of the processes that the storage controller 3 executes in response to an update request from the processor 1.

Figure 8:
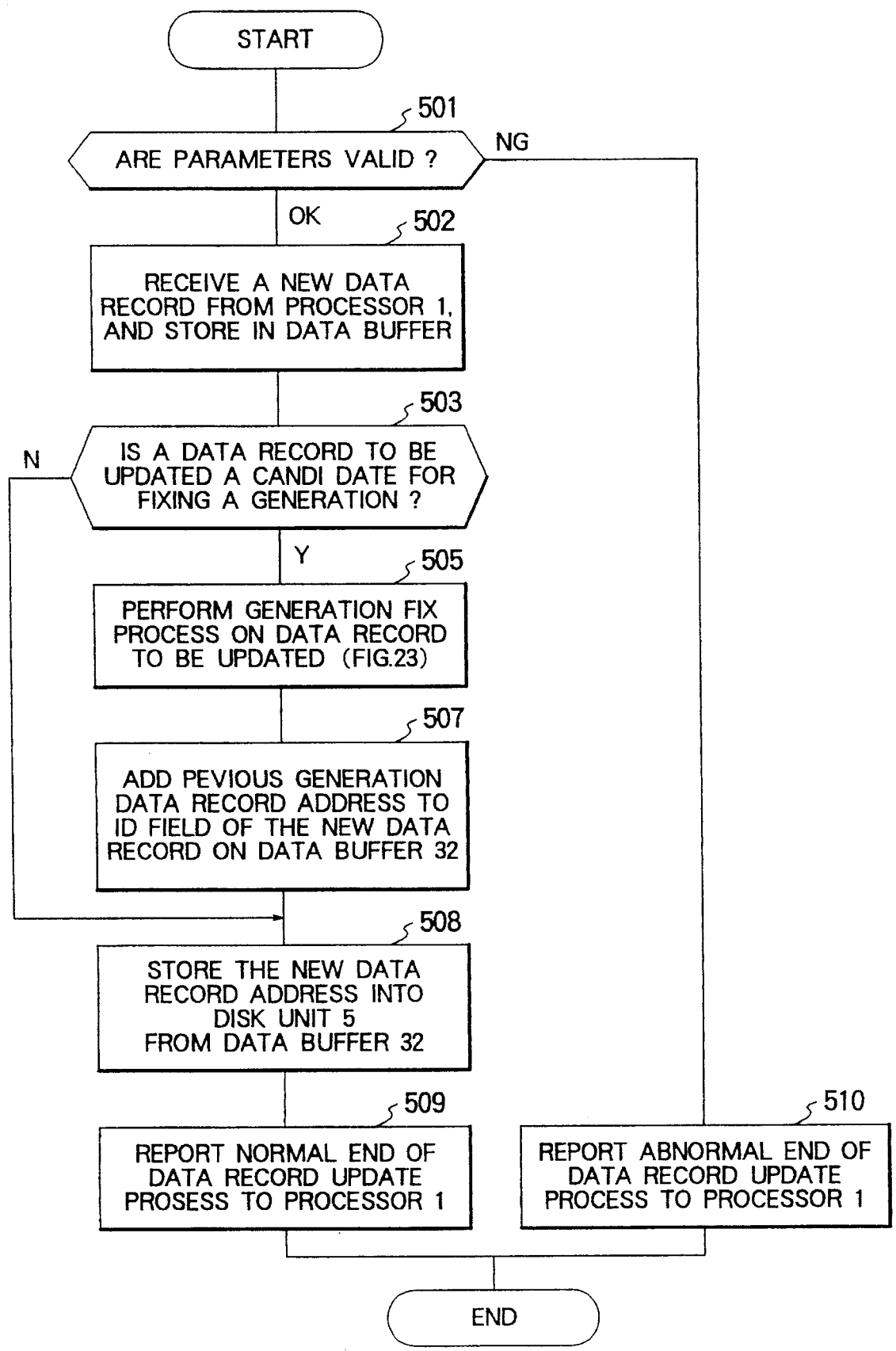
FIG. 8 is a flowchart of a data record update process.

The storage controller 3, when it receives a data record update request, executes a data record update process 36. The flow of the data record update process will be described with reference to FIG. 8.

The data record update request includes an address of a data record to be updated as a parameter. In the data record update process 36, the validity of the parameter given by a data record update request is checked (step 501). As the result of this check, if a decision is made that there is a contradiction in the parameter, at step 510 an abnormal end of the data record update process to the processor 1, with which the process is terminated. If at step 501 a decision is made that the parameter is correct, the storage controller 3 receives a new data record from the processor 1 and stores it in the data buffer 32 (step 502). Subsequently, with reference to the generation control table 312, a decision is made whether or not a data record to be updated is a candidate for being set in a generation fixed status (step 503). If the result of the decision shows that the data record to be updated is a candidate for being set in a generation fixed status, a generation fix process is performed on the data record to be updated (step 505). This generation fix process will be described in detail later on. After the generation fix process has been done on the data record to be updated, in relation to the new data record stored on the data buffer 32 at step 502, the address of a leading data record of a chain of the generation fixed data records, that is, the address on the disk unit, where the data record at the top of a chain of generation fixed data records, that is, the address on the disk unit where there is the old data record to be updated by this update request is added to qian area 907 of the ID field. After this, the new data record stored in the data buffer 32 is read into the disk unit (step 508), and by notifying to the processor 1 that the data record update process has ended normally, the process is finished (step 509).

On the other hand, if at step 503 a decision is made that the data record to be updated is not a candidate for being set in a generation fixed status, without carrying out steps 505, 507, the process moves on to step 508, the new data record is stored in the disk unit 5 and a normal completion of the process is notified to the processor 1.

Figure 9:
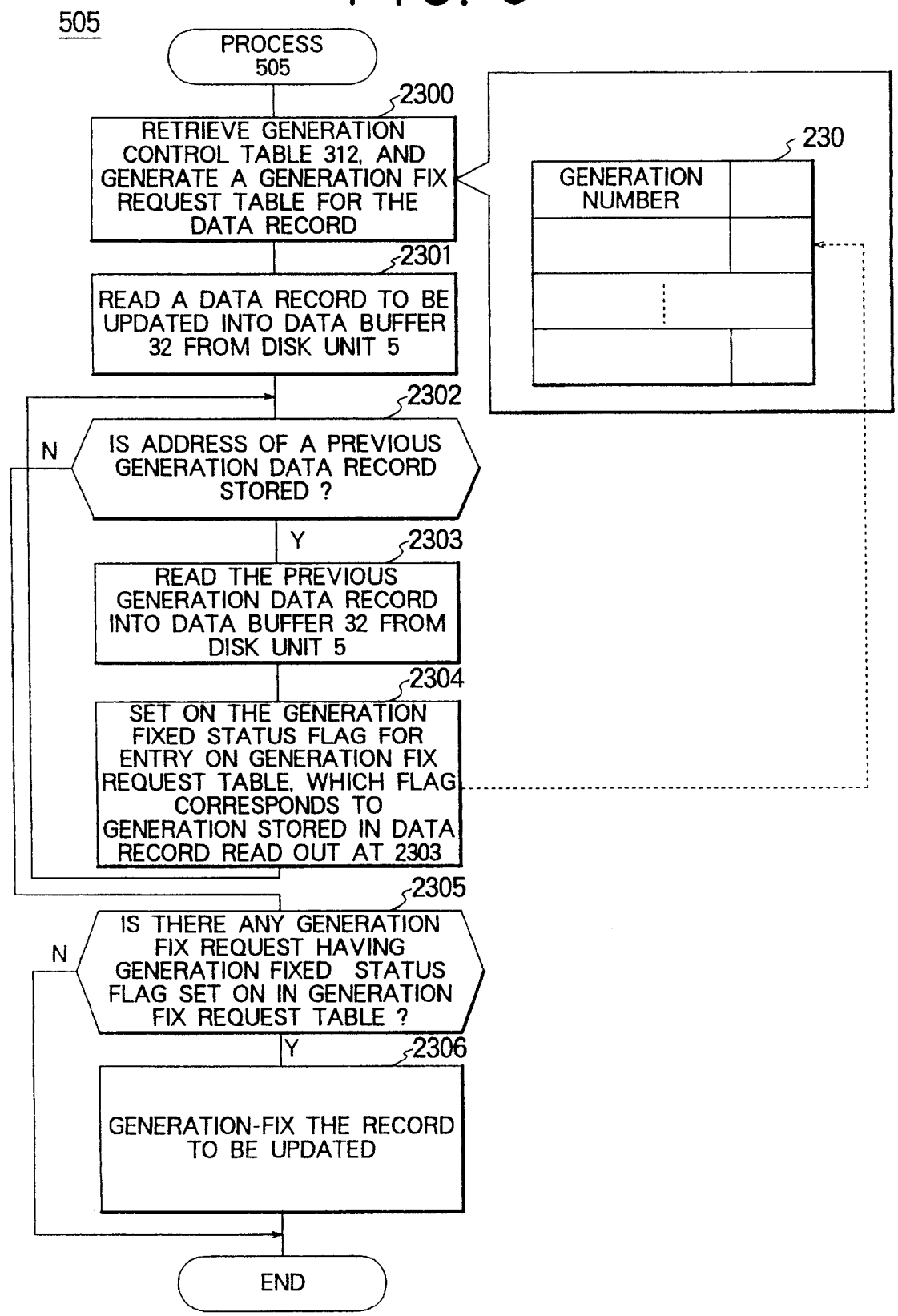
FIG. 9 is a detailed flowchart of step 505 of the data record update process.

FIG. 9 shows a detailed flow of the generation fix process to be performed at step 507.

In the generation fix process of a data record to be updated (step 505 in FIG. 8), a generation fix request table 230 is generated in the working area of the control memory 31 (step 2300). Entries of the generation fix request table 230 include a generation number and a fixed status flag. At step 2300, the generation control table 312 is retrieved, the generations of the generation fix requests having the data records to be updated included in the range of data records to be set in a generation fixed status are extracted, and a generation fix request table is created. Then, at step 2301, a data record to be updated is read into the data buffer 32 from the disk unit 5. Next, a decision is made whether or not a previous generation data record address is stored in the ID field 903 of the data record read to the data buffer 32 (step 2302). If the previous generation data record address is included in the data record, this means that there exists a data record of a generation older than the current data record. If a decision is made that there exists a data record of a generation older than the data record read into the data buffer 32, the previous generation data record prior to the data record present on the data buffer 32 is read from the disk unit into the data buffer 32 (step 2303). Afterwards, in the generation fix request table 230, the generation fixed status flag is set ON which corresponds to the generation stored in the ID field of the data record read into the data buffer 32 at step 2303. In FIG. 9, this process is indicated by the arrow of the dotted line. By performing steps 2303, 2304 for all generation fixed data records corresponding to the data records to be updated, it is possible to find the generations of the generation fix request on data records to be updated which have not been set in a generation fixed status. At step 2305, a decision is made whether or not there is any generation fix request which has the generation fixed status flag set OFF in the generation fix request table 230. If, by the above decision, a generation fix request, for which a generation fix process has not been finished, is found, a data copy process 37 is executed for this generation fix request (step 2306). Whereupon, a generation number of a generation fix request having the generation fixed status flag set OFF is added to the data record read into the data buffer at step 2301, and this data record is stored in the unused area 52 on the disk unit 5. If, at step 2305, a decision is made that there is no generation for which the generation fixed status flag is set OFF, without doing any more thing, the generation fix process is finished.

Figure 10:
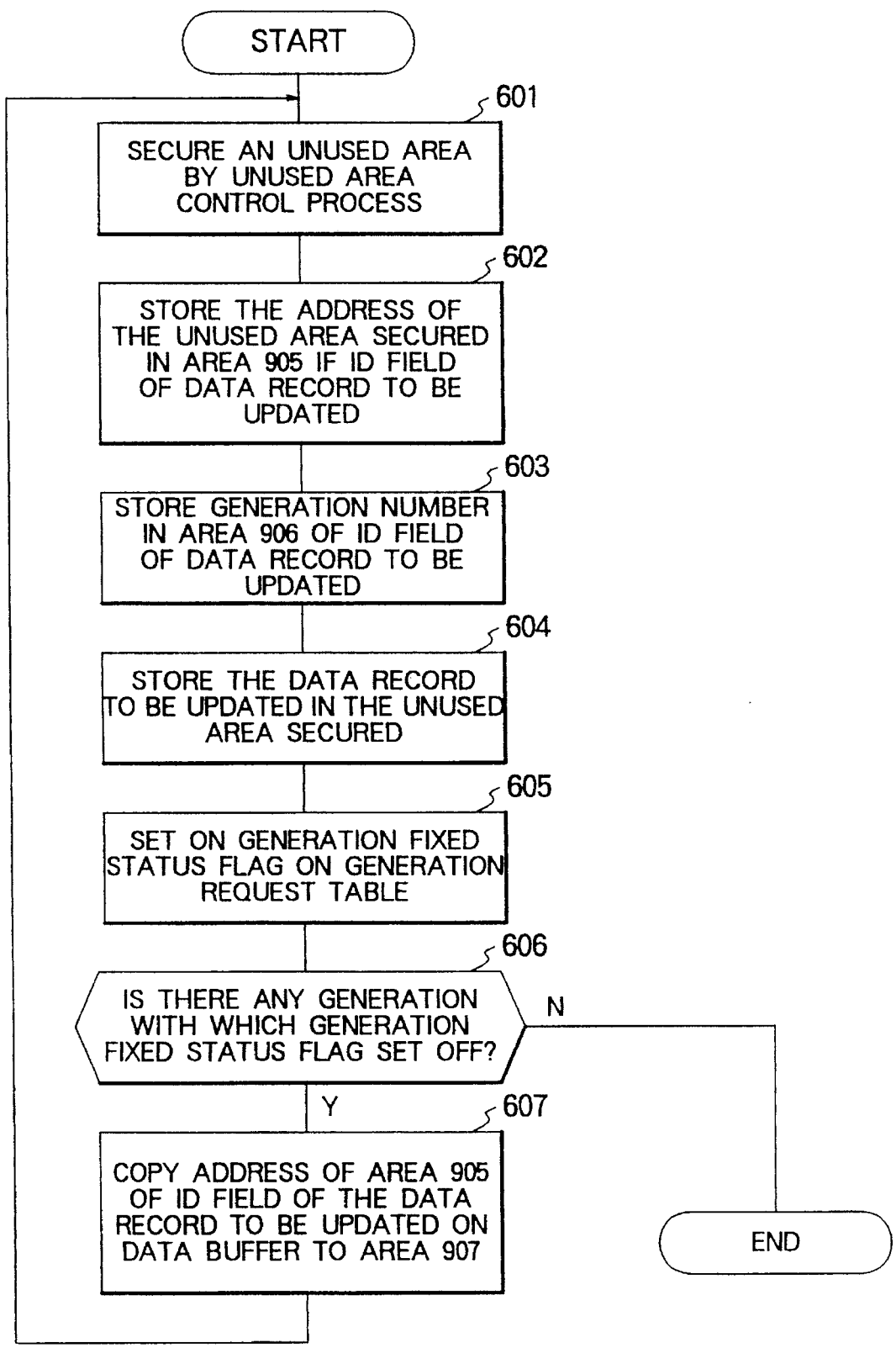
FIG. 10 is a flowchart of a data record copy process.

FIG. 10 is a flowchart of the data record copy process 37 to be executed at step 2306 in the above-mentioned generation fix process. In the data record copy process, a storage area is secured in the unused area 52 on the disk unit 5 to store a generation fixed data record (step 601). Afterwards, an address of the unused area on the disk unit secured at step 601 and a generation number on the generation fix request table 230 are stored in the ID field of the data record on the data buffer 32, which record is set in a generation fixed status (steps 602, 603). Then, the data record to be updated on the data buffer 32 is stored in the area on the disk unit, which has been secured at step 601 (step 604). Next, the generation fixed status flag is set ON for a generation number entered in the generation fix request table 230, with which generation the data record was set in a generation fixed status, and is stored in the disk unit 5 (step 605). A decision is made whether or not there remains any entered generation number with which the generation fixed status flag is set OFF. If there is any entry of a generation number with which the generation fixed status flag is set OFF, the address stored in the area 905 in the ID field of the data record left on the data buffer is copied to the area 907. By this, the data record on the data buffer 32 is chained with the data record stored in the disk unit 5 at step 604. Subsequently, the process returns to step 601, the process same as described above is performed for each generation in the generation fix requests which have not been filled by conducting a generation fix process. At step 606, if a decision is made that all generation fixed status flags are set ON, the data record copy process is finished.

Figure 11:
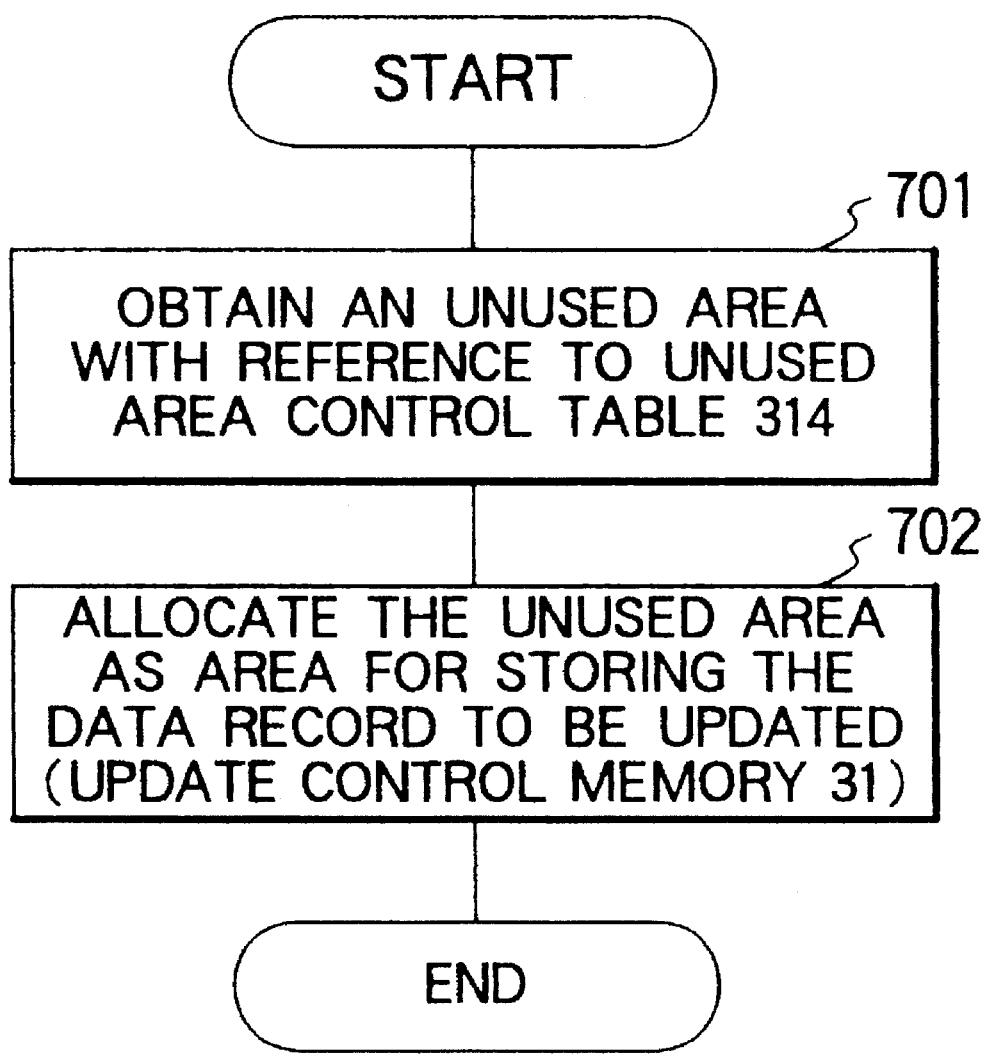
FIG. 11 is a flowchart of an unused area control process.

FIG. 11 shows a flowchart of the unused area control process 35. In the unused area control process 35, the processing program obtains a free space on the unused area 52 on the disk unit with reference to the unused area control table 314 (step 701). At the next step 702, the free space obtained at step 701 is allocated as a storage area for a generation fixed data record. The unused area control table 314 is updated by storing generation numbers in the data record control field 3145 corresponding to the area allocated as the generation fixed data record storage area in the unused area control table 314.

Figure 12:
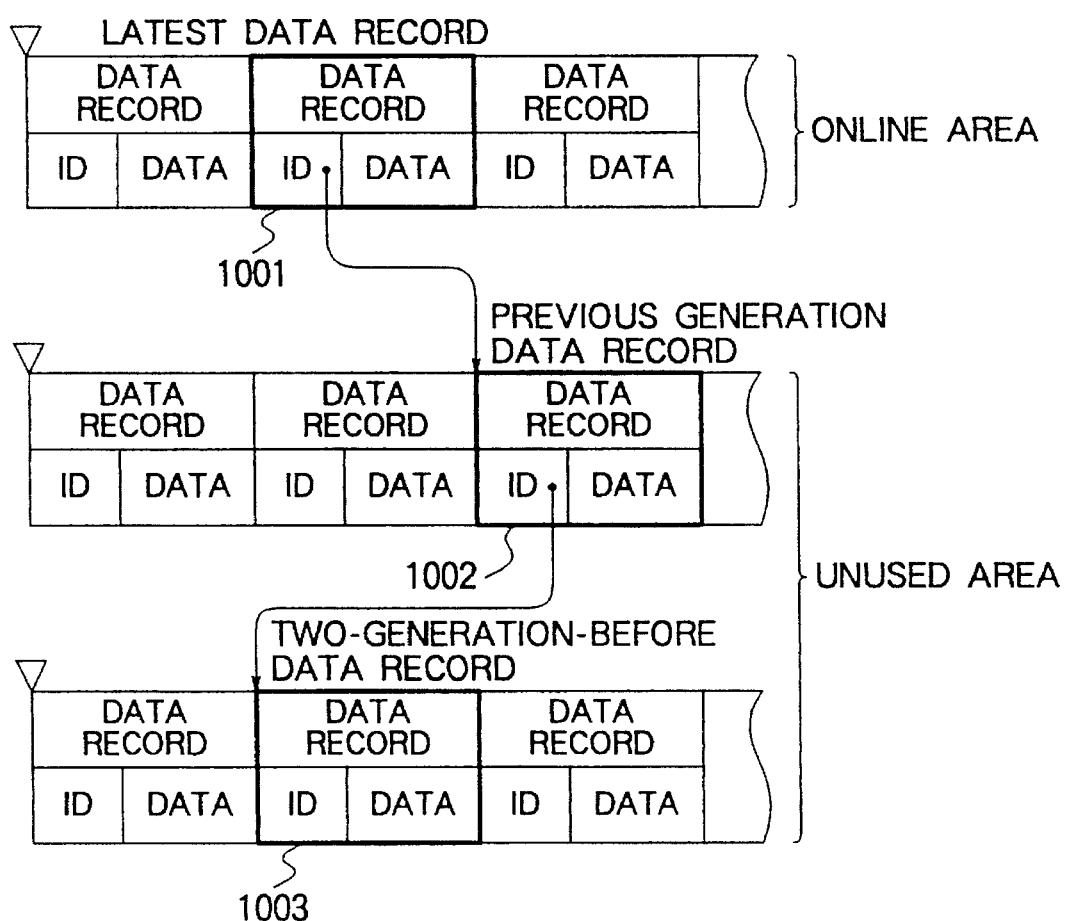
FIG. 12 is a diagram showing the relation between a generation fixed data record and an updated data record.

As a result of the above process steps, when an update request is issued to a data record in a generation fixed status, the old data record is stored as a generation fixed data record in the unused area 52 of the disk unit 5. FIG. 12 shows relations of data records in a case where there are a number of generation fixed data records for a data record to be updated, that is, in a case where a generation fix request have been issued at a plurality of points of time. The latest data record 1001 is stored in the online area of the disk unit 5. In the ID field of this data record 1001, an address showing the storage area for the previous generation fixed data record 1002 corresponding to that data record. In addition, in the ID field of the generation fixed data record 1002, an address of the area where a generation fixed data record two generations before is stored. In this way, a chain is formed among the corresponding data records. In FIG. 12, the arrow extending from the ID field of a data record means that information stored in the area 907 in FIG. 5 indicates the storage location of a generation fixed data record one generation before.

Description will now be made of a process executed by the storage controller 3 in response to a generation fixed data record read request issued at step 202 of the dump program 12 that runs on the processor 1.

Figure 13:
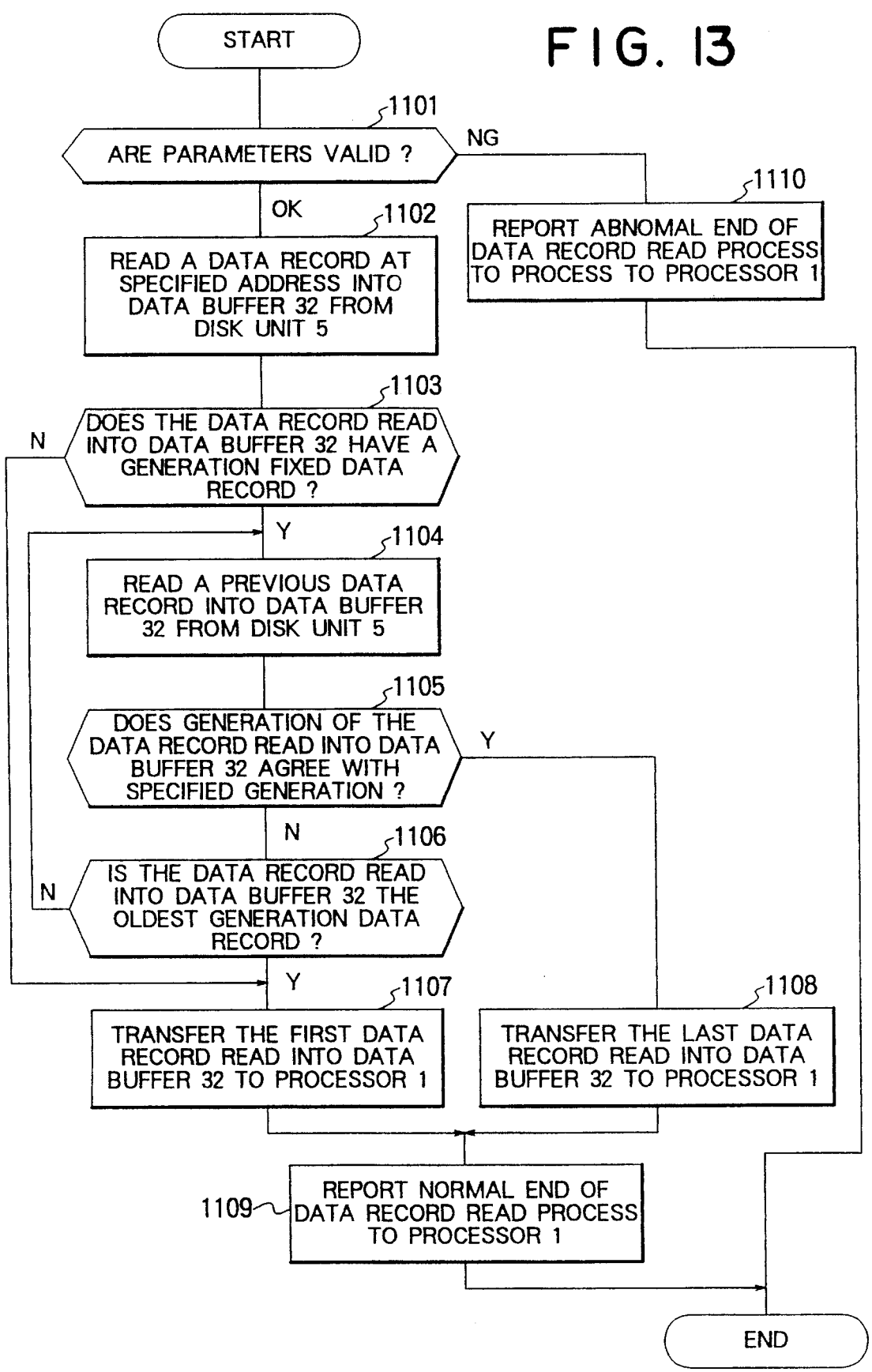
FIG. 13 is a flowchart of a generation fixed data record read process.

On receiving a generation fixed data record request from the processor 1, the storage controller 3 executes a generation fixed data record read process 34. FIG. 13 shows a flowchart of the generation fixed data record read process 34. The generation fixed data record read request issued by the dump program 12 in the processor 1 includes an address and a generation number of a data record to be read as input parameters. In the generation fixed data record read process 34, the validity of the parameters is checked (step 1101). If any contradiction is detected in the parameters at step 1101, an abnormal end of the data record read process is reported to the processor 1 at step 1110, with which the generation fixed data record read process is terminated. When the validity of the parameters is confirmed at step 1101, the data record stored at the address specified by the parameter is read to the data buffer 32 from the disk unit 5 (step 1102). A decision is made whether or not the data record read into the data buffer 32 has a corresponding data record set in a generation fixed status (step 1103). If a decision is made that the data record read into the data buffer 32 at step 1103 has a corresponding generation fixed data record, this means that the data record has not been updated since it was set in a generation fixed status. Therefore, in this case, the process proceeds to step 1107 where the data record read into the data buffer 32 at step 1102 is transferred to the processor 1. On the other hand, if, at step 1103, a decision is made that the data record read into the data buffer 32 has a corresponding generation fixed data record, a previous generation fixed data record is read into the data buffer 32 from the disk unit 5 at step 1104. Note that the data buffer 32 has a capacity for storing two or more data records, the data record which is read at step 1102 and the data record which is read at step 1104 are stored in different areas. Then, a decision is made whether or nor the generation of the data record read out at step 1104 agrees with the specified generation (step 1105). If the agreement of generations is confirmed at step 1105, the storage controller 3 transfers the data record to the processor 1 (step 1108). If the generations do not agree, a decision is made whether or not the data record read into the data buffer 32 is the oldest generation data record (step 1106). Consequently, if a decision is made that the data record is the oldest generation data record, it can be decided that the generation fixed data records do not include a data record of the specified generation. In this case, the process advances to step 1107 where the data record read into the data buffer 32 at step 1102 is transferred to the processor 1. After the data record is transferred to the processor 1 at step 1107 or 1108, the generation fixed data record read process is finished by reporting a normal completion of the data record read process to the processor 1.

In the above process, the decisions at steps 1103, 1105, and 1106 are made based on the generation number stored in the area 906 and the previous generation data record address stored in the area 907 of the ID field 903 shown in FIG. 5. The step 1105 is performed by deciding whether or not the generation stored in the ID field 903 agrees with the generation specified by the parameter of the generation fixed data record read request.

When the data record subject to the dump process is transferred to the processor 1 as mentioned above, the processor 1 writes the data record in the tape unit 7. When the above process has been done for all data records to be dumped, the processor 1 issues a generation unfix request to the storage controller 3. This generation unfix request includes a generation number specified by the generation fix request issued to set data records to be dumped in a generation fixed status. On receiving this command, the storage controller 3 executes the generation fix/unfix process 33. The generation unfix process carried out by the generation fix/unfix process 33 will then be described with reference to FIG. 7.

As mentioned in the description of the generation fix request, in the generation fix/unfix process 33, at step 301 the validity of the generation as one parameter is checked, and if any contradiction is found in the generation, at step 305 an abnormal end of the generation fix process is reported to the processor 1, with which the process is terminated. If the generation is found to be valid at step 301, the kind of process request is decided at step 302. In this case, since the received request is a generation unfix request, the process proceeds to step 306. At step 306, the data record area corresponding to the generation on the unused area control table 314 is put into an unused status. More specifically, the data record control fields 3145 as the entries of the track control tables 3143 in the unused area control table 314 are searched for the data record control fields 3145 where the generations specified as the parameter in the generation unfix request are already entered. "0" is entered in the data record control fields 3145 which have the corresponding storage areas where the specified generation is already entered. After this, generation control information corresponding to the specified generation is deleted from the generation control table 312 at step 307, and by finally reporting a normal completion of the generation unfix process to the processor 1, the process is finished.

Description has been made of the processes of the dump program 12 and the storage controller 3 the latter receives commands from the dump program 12.

By the process described above, after the start of the dump program, even when an update process requested by the online program is performed on a data record as a candidate for being dumped by the dump process, by reading generation fixed data records saved in the unused area of the disk unit in the update process, it is possible to copy the data records which were present at the start time of the dump process to the tape unit. In this embodiment, the generation fixed data records yet to be updated are stored in the unused area on the disk unit 5, but a special-purpose disk unit dedicated to storing the date records yet to be updated may be provided in the storage controller 3.

Figure 14:
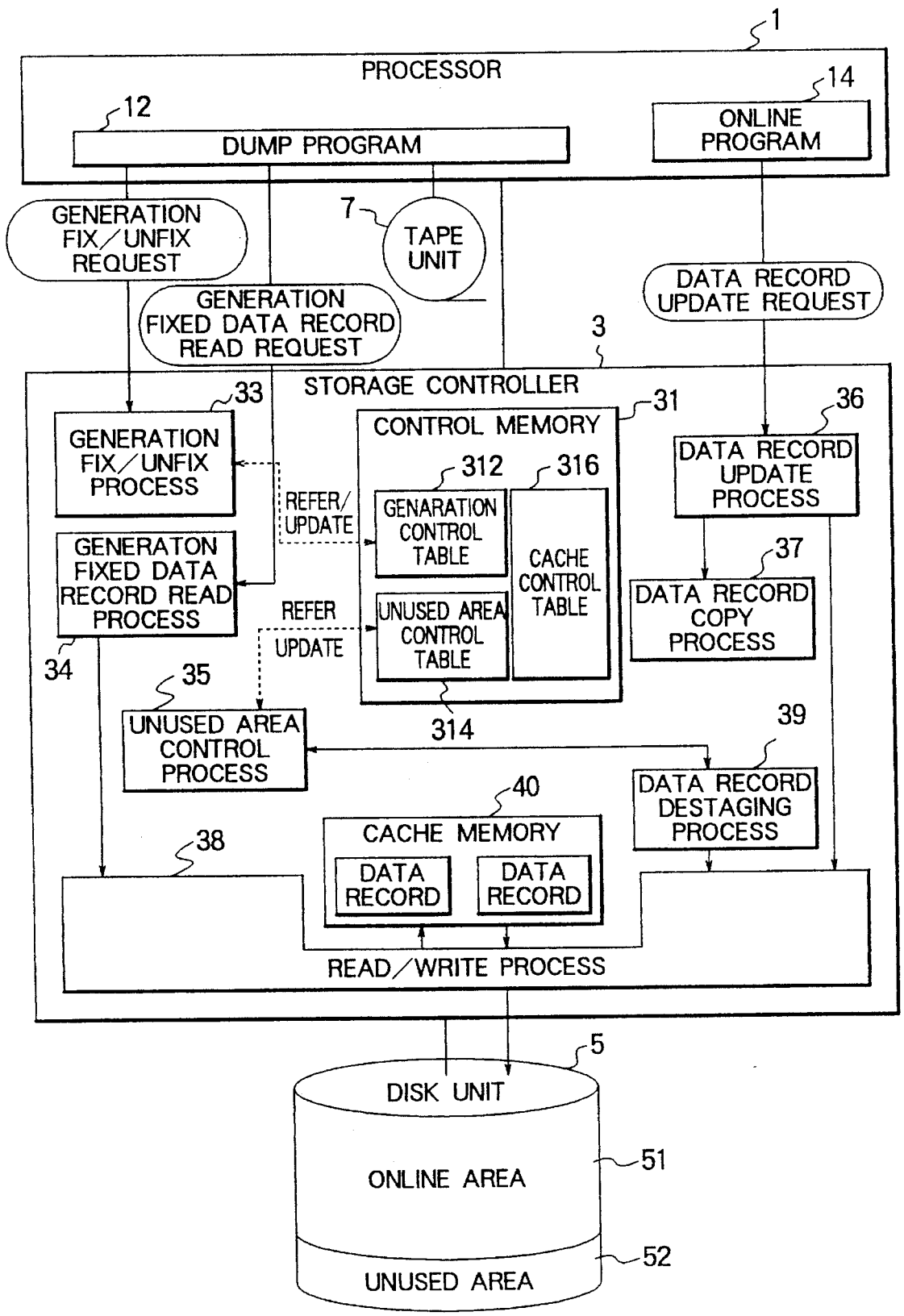
FIG. 14 is a block diagram showing a logical structure of a computer system according to a second embodiment.

FIG. 14 is a block diagram of a computer system having a storage controller according to a second embodiment of the present invention. A difference of the second embodiment from the first embodiment is that a cache memory 40 is provided in the storage controller 3. Accordingly, a cache control table 316 is added to the control memory 31. The data records in the cache memory 40 are controlled by the cache control table 316. In this second embodiment, the storage controller 3 is provided with a write-after function which, when the storage controller 3 receives a data record write request from the processor 1, reports the end of an update process to the processor 1 the moment the data records to be updated are stored in the cache memory 40, and stores new data records into the disk unit 5 asynchronously with the data record update request from the processor 1. In order to exercise the write-after function, the storage controller 3 has further included in the processing program of the control processor a data record destaging process 39 in addition to the processes described in reference to the first embodiment. The cache memory 40 and the control memory 31 are nonvolatile by use of battery power supply or the like to prevent a new data record from being lost by occurrence of power failure, for example, for a period from when the storage controller 3 reports the end of the update process to the processor until the old data record is actually stored in the disk unit 5.

Figure 15:
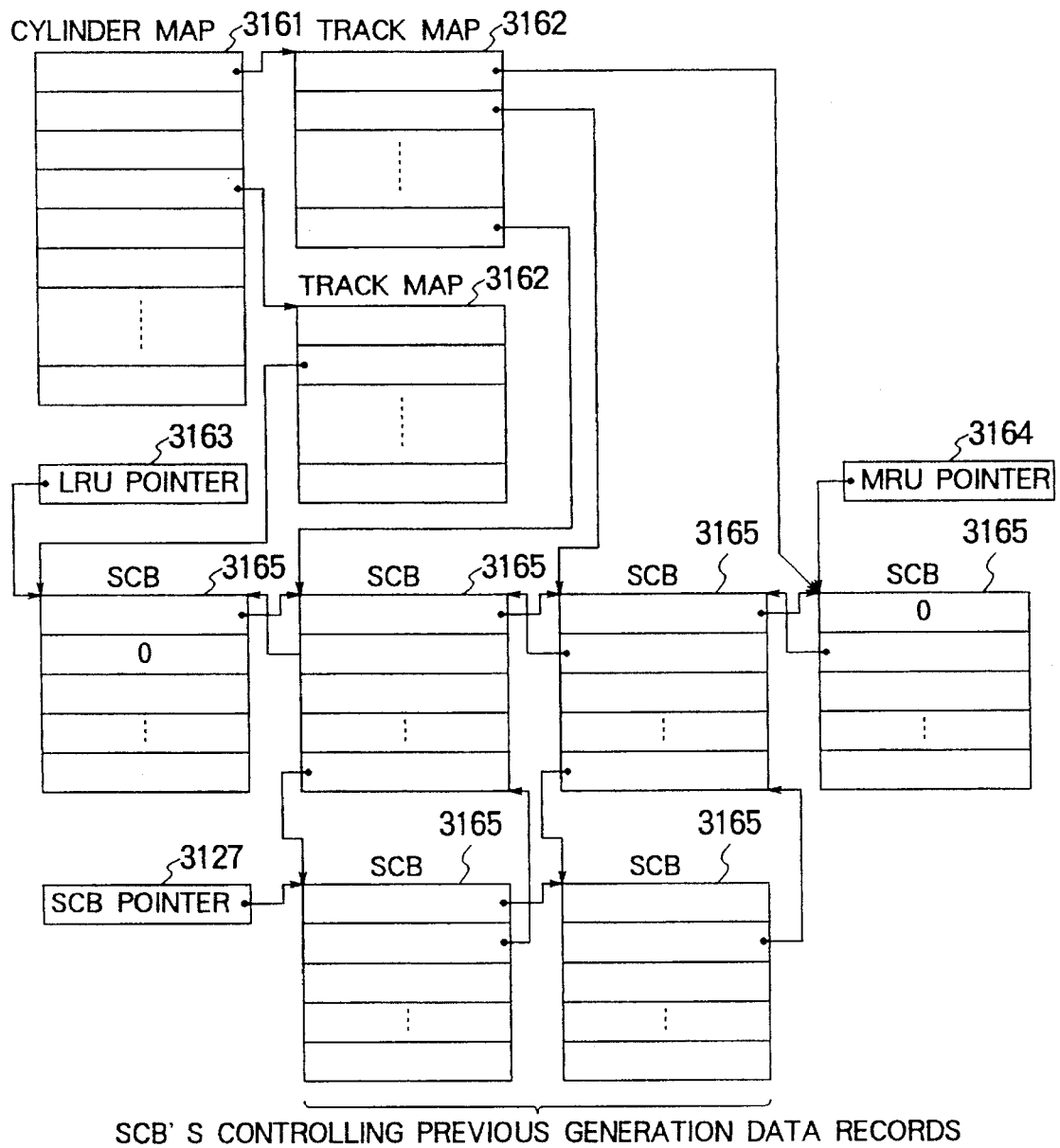
FIG. 15 is a diagram showing a cache control table.

FIG. 15 is a block diagram of a cache control table 316. In this embodiment, Data records in the cache memory 40 are controlled in track units used on the disk unit 5. The cache control table 316 includes a cylinder table 3161 having entries corresponding to the cylinders of the disk unit 5, track tables 3162 each having entries corresponding to the tracks of a cylinder, and slot control blocks (SCB's) 3165 pointed to by entries of the track tables, and controlling the areas of the cache memory 40 storing data records on the tracks. The SCB's 3165 controlling the areas of the cache memory form an SCB chain having an LRU pointer as the start point and an MRU pointer as the end point. When the data records on a certain track are referenced by the processor 1, the SCB controlling the track is connected ahead of the MRU pointer 3164. Therefore, for the tracks controlled by an SCB 3165 on the side of the LRU pointer 3163, the closer to the LRU pointer 3163 the track is, the longer the elapsed time since the data records in the track were referenced will be. When an additional area of the cache memory 40 is required, if there is no unused area in the cache memory 40, the storage controller 3 an area controlled by an SCB 3165 pointed to by the LRU pointer 3163.

Figure 16:
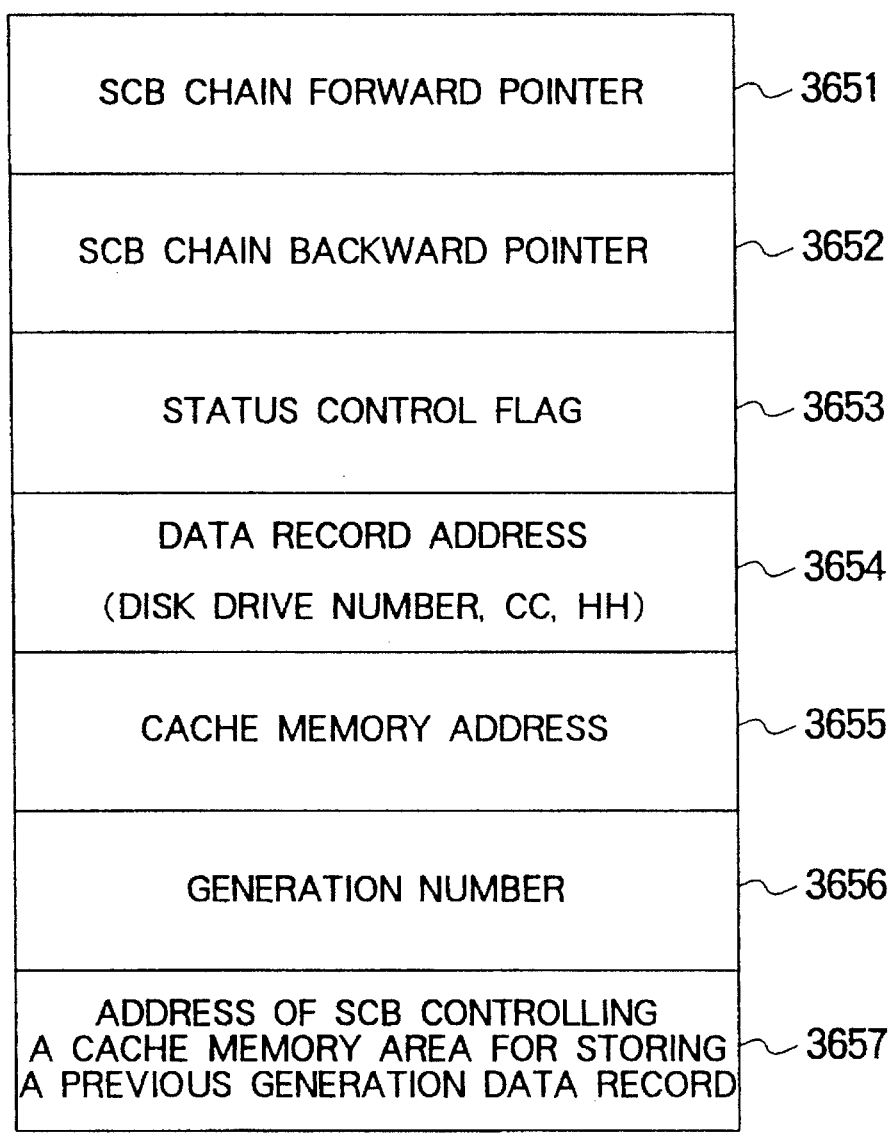
FIG. 16 is a diagram showing a slot control block (SCB)

As shown in FIG. 16, each SCB 3165 includes entries, such as an SCB chain forward pointer 3651 and an SCB chain backward pointer 3652 both used to form an SCB chain, a status control flag 3653 controlling the status of the corresponding SCB, a data record address formed by a disk number, a cylinder address (CC) and a track address (HH), and a cache memory address 3655 showing the storage location in the cache memory 40. In addition, in this embodiment, there are provided a generation number 3656 and an SCB address 3657 for controlling the cache memory area storing previous generation data records. The area of the cache memory for storing generation fixed data records is controlled by collecting the data records of the same generations in groups. To this end, an SCB chain having an SCB pointer 3127 on the generation control table 312 to be described later as the start point is formed of the SCB's 3165 for controlling the areas storing the generation fixed data records of the same generation. The SCB's entered in this SCB chain are sorted in the order of addresses of the data records.

FIG. 17 is a diagram showing the composition of the generation control table 312. The generation control table 312 of this embodiment has almost the same composition as that of the generation control table 312 of the first embodiment, only difference from the generation control table of the first embodiment being that the table of this embodiment includes a field for storing the SCB pointer 3127 as the start point of the SCB chain made up of SCB's for controlling the areas of the cache memory containing generation fixed data records of the same generation as mentioned above.

The other parts, exclusive of the one different aspect mentioned above, of this embodiment which are identical with those of the first embodiment will not be described here.

Description will next be made of the processes to be executed by the storage controller 3 in this embodiment. The processes by the dump program 12 and the online program 14 which run on the processor 1 are the same as those of the first embodiment, and therefore will not described again.

Figure 18:
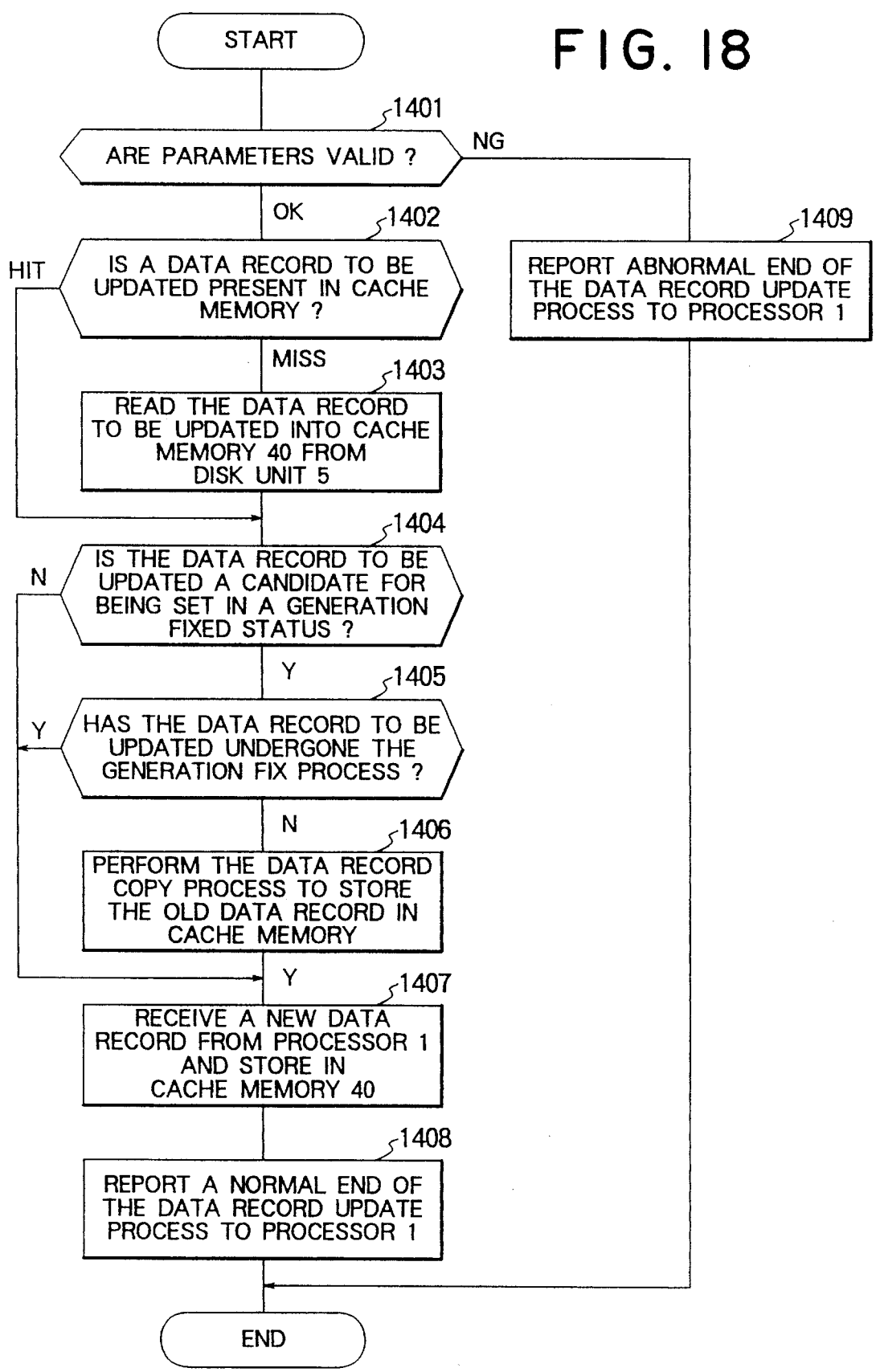
FIG. 18 is a flowchart showing a data record update process in the second embodiment.

Description will be made of the process when an update request is issued from the online program 14 which runs on the processor 1. On receiving the data record update request, the storage controller 3 executes the data record update process 36. FIG. 18 is a flowchart of the data record update process 36 in this embodiment. The data record update request includes an address of a data record to be updated as a parameter, and therefore in the data record update process, the validity of the parameter is checked (step 1401). If a decision is made by this check that there is contradiction in the parameter, at step 1409 an abnormal end of the data record update process is reported to the processor 1, the process is terminated. If a decision is made at step 1401 that the parameter is valid, a hit/miss decision is made to decide whether or not the data record specified by the parameter is present in the cache memory 40 (step 1402). The hit/miss decision is made by referring to the cache control table 316 on the control memory 31. If a decision is made that the data record to be updated is not present in the cache memory 40, at step 1403 the data record to be updated is read into the cache memory 40 from the disk unit 5. In this step, all data records included on a track where there is the data record to be updated are read collectively into the cache memory 40. After the data record to be updated is read into the cache memory 40 at step 1403, or when a decision is made at step 1402 that the data record to be updated is present in the cache memory 40, a decision is made whether or not the data record is included in the data records to be set in a generation fixed status (step 1404). This decision is made by referring to the generation control table. As a result, if it is found that the data record to be updated is a candidate for being set in a generation fixed status, then a decision is made whether or not the data record to be updated has already undergone the generation fix process (step 1405). To be more specific, with regard to each entry of the generation control table 312 which includes the data record to be updated in the range of data records to be set in a generation fixed status, the SCB chain connected to the SCB pointer in the field 3127 is examined from one SCB to another to find if an SCB which holds the address of the data record to be updated exists in its entry of data record address. If there is an entry in which there is no such a SCB, it can be decided that the data record to be updated has not undergone the generation fix process with a generation stored in that entry. If a decision is made that the data record to be updated has not undergone the generation fix process, at step 1406 the data record copy process 37 is performed to store (copy) the data record to be updated in an area in the cache memory 40 as a generation fixed data record. Note that the generation fixed data record is stored in the cache memory 40 until a generation unfix request is issued from the processor 1. After the end of step 1406, if a decision is made at step 1405 that the data record to be updated has undergone the generation fix process, or if a decision is made at step 1404 that the data record to be updated is not a candidate for being set in a generation fixed status, step 1407 is executed. At step 1407, a new data record is sent from the processor 1, and the new data record is stored in an area in the cache memory 40 on which the data record to be updated exists. After this, a normal completion of the data record update process is reported to the processor 1 (step 1408), with which the process is finished.

Figure 19:
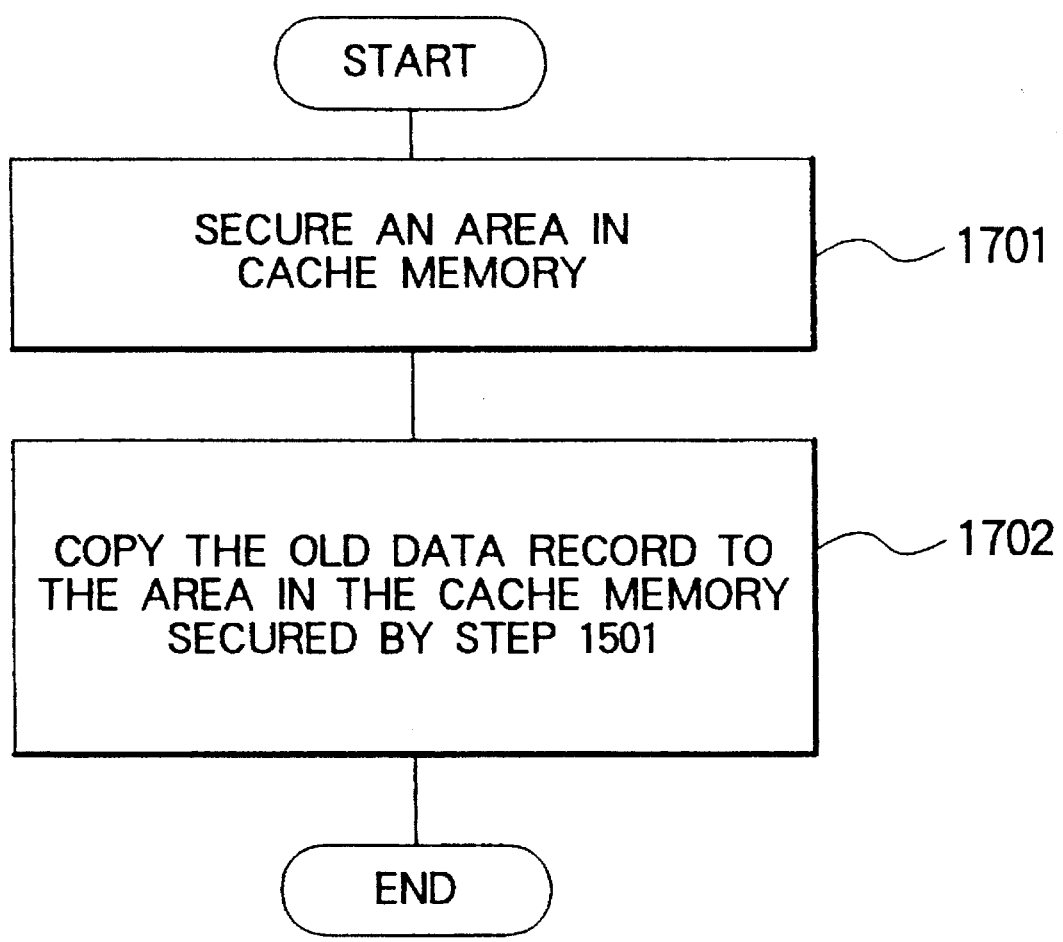
FIG. 19 is a flowchart showing a data record copy process in the second embodiment.

FIG. 19 is a flowchart of the data record copy process executed at step 1406. By referring to the cache control table 316, an area is secured in the cache memory to store generation fixed data records (step 1701). In this case, the area in the cache memory 40 controlled by an SCB which is pointed to by the LRU pointer 3136 is allocated as the area to store the generation fixed data records. The data record to be updated held in the cache memory is copied as a generation fixed data record to the area of the cache memory 40 secured at step 1701 (step 1702). The SCB for controlling the area where the generation fixed data record is stored is connected in the order of data record addresses to an SCB chain leading to SCB pointers of the entries having the corresponding generation in the generation control table 312. At step 1405 of the data record update process, if data records of a plurality of generations which have not undergone any generation fix process are found, data records of different generations are separately subjected to the above-mentioned data record copy process.

When an update request is issued to a data record set in a generation fixed status by the above process, the old data record is held in the cache memory 40. The new data record sent from the processor 1 is stored in the disk unit 5 by the data record destaging process 39 asynchronously with the update request from the processor 1. The destaging process 39 in this embodiment will not be described because the process in the conventional storage controller can be applied.

Description will next be made of the data record read process 34 executed by the storage controller 3 in response to a generation fixed data record read request issued by the dump program 12 that runs on the processor 1, in order to copy a generation fixed data record to the tape unit.

Figure 20:
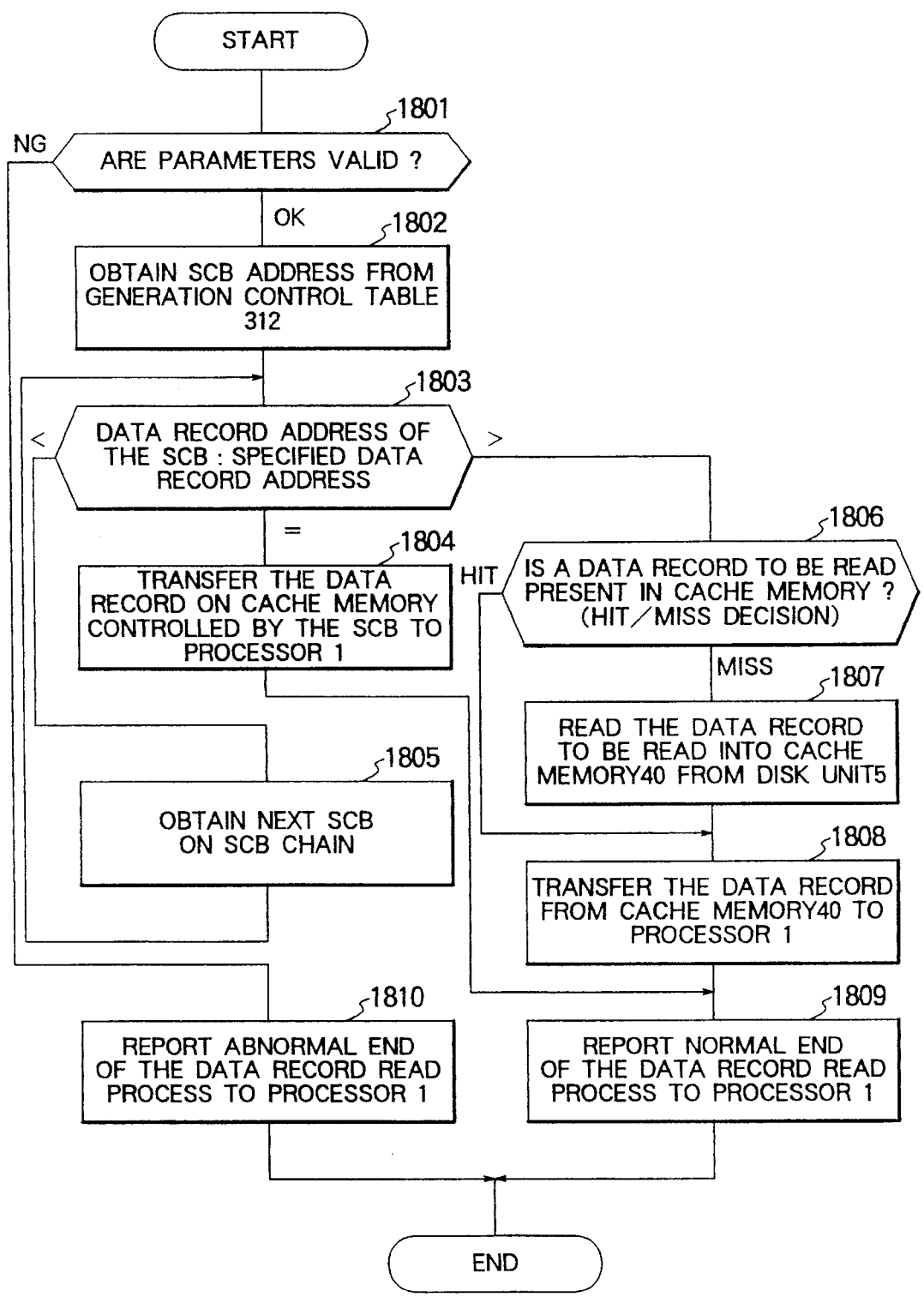
FIG. 20 is a flowchart showing a generation fixed data record read process in the second embodiment.

FIG. 20 is a flowchart of the generation fixed data record read process 34 in this embodiment. The generation data record read request includes an address and a generation of a data record to read as parameters. In the generation fixed data record read process, the validity of the parameter is checked (step 1801). If any contradiction is found in the parameters by this check, at step 1801 an abnormal end of the data record read process is reported to the processor 1, with which the process is terminated. When the validity of the parameters is confirmed at step 1801, the address of the SCB 3165 controlling the generation fixed data record having a specified generation as a parameter is obtained from the SCB pointer 3127 of the entry having the corresponding generation in the generation control table 312 (step 1802). Whether there are generation fixed data records exist or not is checked (step 1803). As explained earlier, the SCB 3165 controlling the area of the cache memory which stores generation fixed data records of the same generation is connected in the SCB chain having the SCB pointer 3165 as the start point. The SCB's 3165 in the SCB chain are sorted in the order of data record addresses. At step 1803, by comparing the data record address entered in the SCB with the data record address in the request, a decision is made whether or not the generation fixed data record is present in the cache memory 40 having the specified generation. If the result of comparison shows that the data record addresses entered in the SCB 3165 are smaller than the data record address specified by the parameter, at step 1805 the process returns to step 1803 to handle the next SCB 3165 on the SCB chain. At step 1803, if data record addresses entered in the SCB 3165 used in the comparison step are greater than the specified data record address, the generation fixed data record at the specified data record address does not exist in the area in the cache memory 40 controlled by the SCB's 3165 connected in the SCB chain. This means that the data record requested by the processor 1 has been set in a generation fixed status, but is not updated. Therefore, in this case, the process advances to step 1806 where by referring to the cache control table 316, a decision is made whether or not the address of the data record specified by the parameter exists in the cache memory 40. If the result of this decision turns out to be a miss-hit, according to this data record address, the target data record is read into the cache memory 40 (step 1807). If the decision at step 1806 turns out to be a hit, after this target data record is read into the cache memory at step 1807, the target data record in the cache memory 40 is transferred to the processor 1 (step 1808). On the other hand, if a data record address entered in an SCB 3165 used as the object of processing agrees with the specified data record address, this means that the generation fixed data address to be transferred exists in the area in the cache memory which is controlled by the SCB 3165 mentioned above. Therefore, at step 1804 the generation fixed data record is read from the cache memory and transferred to the processor 1. At step 1804 or 1808, after the data record is transferred, a normal end of the data record read process is reported to the processor 1, with which the process is completed (step 1809).

The data record thus transferred to the processor 1 is stored in the tape unit 7 by the processor 1. After all data records subject to the dump process are stored in the tape unit 7, the processor 1 issues a generation unfix request. The generation unfix request includes as a parameter the generation specified by the generation fix request issued to set the dumped data records in a generation fixed status. When receiving the generation fix request, the storage controller 3 executes the generation fix/unfix process 33. The generation fix process in this embodiment is for the most part the same as in the first embodiment shown in FIG. 7, with only one exception of step 306. In the first embodiment, instead of this process, at step 306, a process is executed to put in the unused status the SCB 3165 controlling the area of the cache memory 40 which holds the generation fixed data record stored therein.

In the embodiment described above, when an update request is issued to some data record set in a generation fixed status before the dump process, the old data record is stored as a generation fixed data record in the cache memory. Therefore, even when a data record as a candidate for undergoing the dump process is updated during the dump process by reading the data records stored in the cache memory as generation fixed data records, the data records at the start time of the dump process can be written securely into the tape unit.

Figure 21:
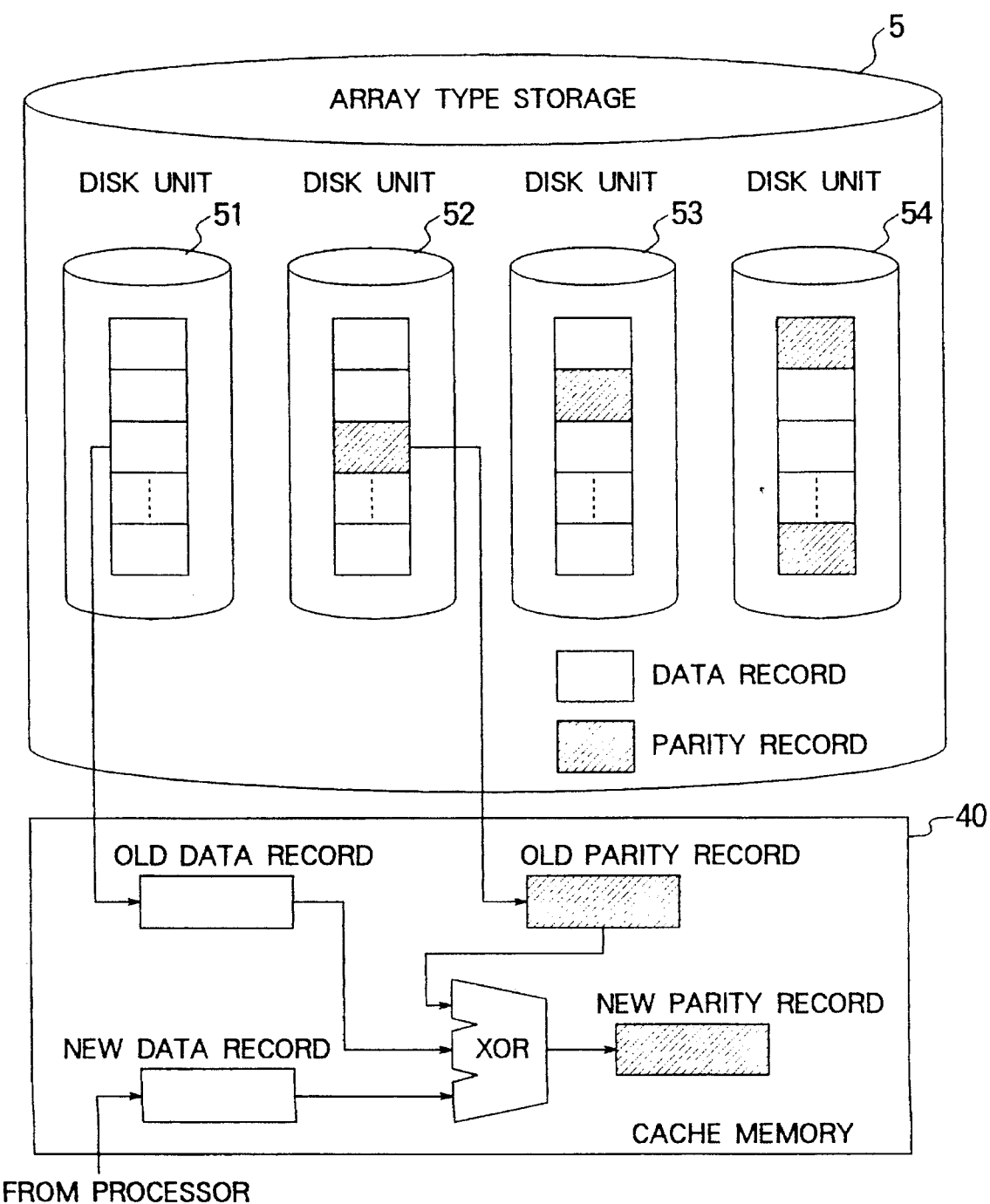
FIG. 21 is a schematic diagram of a data update process in the disk array.
Figure 22:
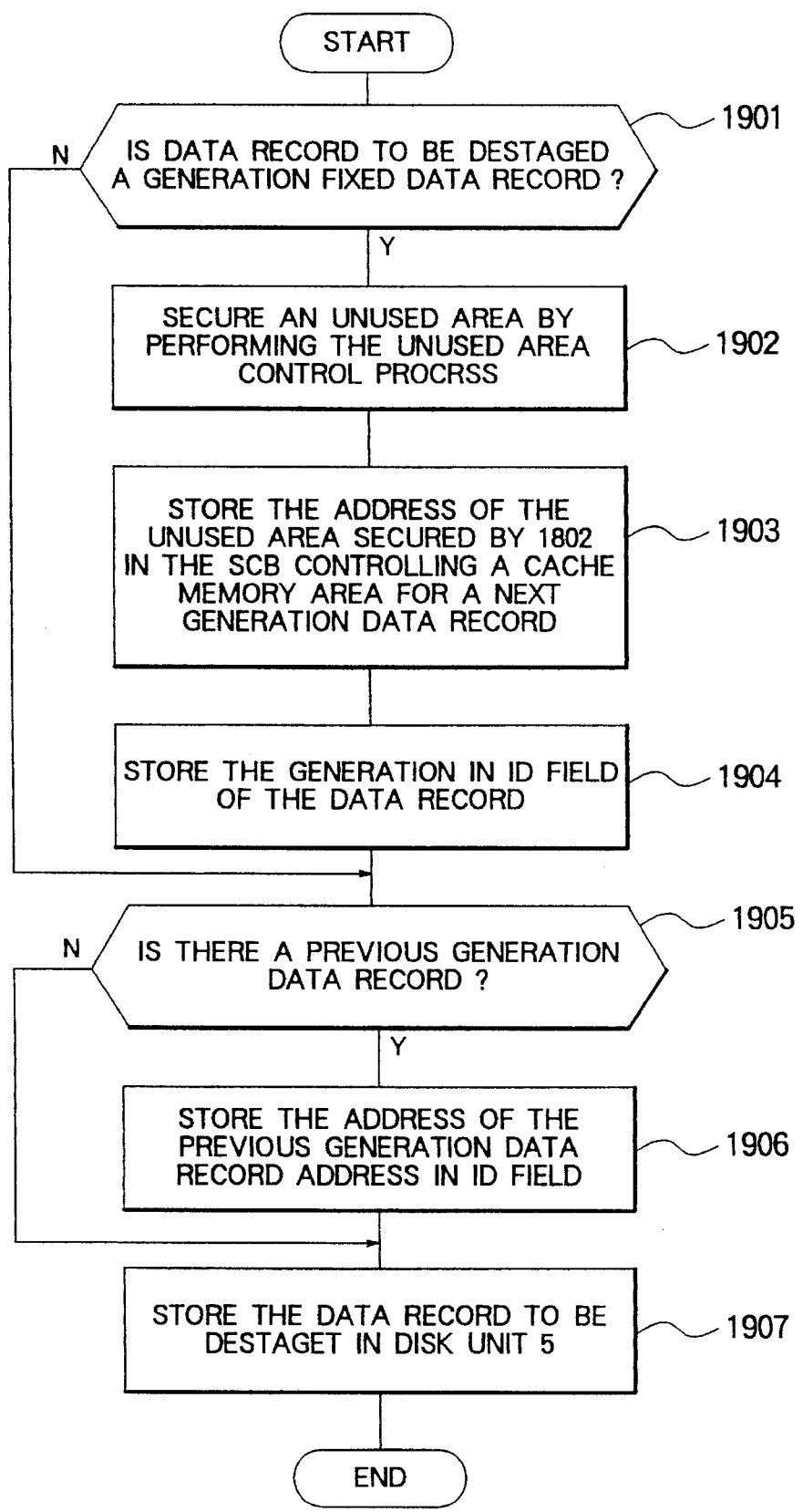
FIG. 22 is a flowchart of a data record destaging process in a third embodiment.

In the second embodiment, in the data record update process, a data record to be updated is read into the cache memory. This arrangement is suitable for a case where the disk unit is an array type storage device. This will be described with reference to FIG. 21. FIG. 21 schematically shows how a data record is updated in an array type storage device. As shown in FIG. 21, the array type storage device, including a plurality of disk units 51 to 54, generates redundant records (hatched records in FIG. 21), a representative one of which is a parity record, from a plurality of data records (three data records in FIG. 21) sent from the processor, and stores them in different disk units. By this arrangement, the array type storage device has high performance and high reliability. In such an array type storage device, when the processor issues a request that a data record be updated, it is necessary to update the corresponding parity record and create a new parity record. This new parity record can be obtained from an old data record, a new data record and an old parity record. Above all, when a new parity record is created by using a cache memory, the old data record is read into the cache memory. To be more specific, the old data record and the old parity record in addition to a new record are read into the cache memory, and those records are XORed to create a new parity record. Therefore, when an array type storage device such as this is used, the old data record read process executed at step 1403 in FIG. 18 can be prevented from becoming overhead.

In the second embodiment, the generation fixed data records are held in the cache memory until a generation unfix request is issued. Therefore, in the second embodiment, a cache memory with a sufficient capacity is required. Description will now move on to a third embodiment in which generation fixed data records are stored in a disk unit 5, so that the cache memory can be used more effectively.

One different aspect of the third embodiment from the second embodiment is that generation fixed data records are included in the data records as candidates for receiving the data record destaging process 39. As a result, the contents of the data record destaging process 39 and the generation fixed data record read process 34 differ from those in the second embodiment, but in the other respects, the third embodiment is the same as the second embodiment. The parts other than the above-mentioned processes of the third embodiment will be described with reference to the figures used in the second embodiment and using the reference numerals used in the second embodiment.

FIG. 19 is a flowchart of the data record destaging process 39 in this embodiment. The data record destaging process 39 is started at specified timing when there is a new data record for which the update result is not reflected in the disk unit 5 regardless of reception of a data record update request from the processor 1. In the data record destaging process 39, a decision is made whether or not a data record to be destaged is a generation fixed data record (step 1901). If the data record to be destaged is a generation fixed data record, to store the data record, it is necessary to secure an unused area of the disk unit 5. Therefore, in this case, the unused area control process 35 is started to secure an unused area on the disk unit 5 (step 1902). The unused area control process 35 is the same process as described with reference to FIG. 11 in the first embodiment, and therefore will not be described here. When an unused area can be secured on the disk unit 5, the address of the secured unused area of the disk unit 5 is stored in the entry 3657 on the SCB 3165 controlling a next generation data record (step 1903). Subsequently, the generation stored in the entry 3656 of the SCB 3165 is stored in the area 906 of the ID field 903 of the generation fixed data record (step 1904). After the end of step 1904 or if a decision is made at step 1901 that the data record to be destaged is not a generation fixed date record, then a decision is made whether or not there is a previous generation data record (step 1905). This decision is made by deciding whether or not a data record address has been entered in the entry 3657 on the SCB 3161. If the decision is that there is the previous generation data record, the storage address of the previous generation data record in the area 907 in the ID field 903 (step 1906). Afterwards, the data record to be destaged is stored in the disk unit 5 (step 1907), with which the data record destaging process 39 is completed. The formats of ordinary data records and generation fixed data records stored in the disk unit are the same as shown in FIG. 5.

Figure 23:
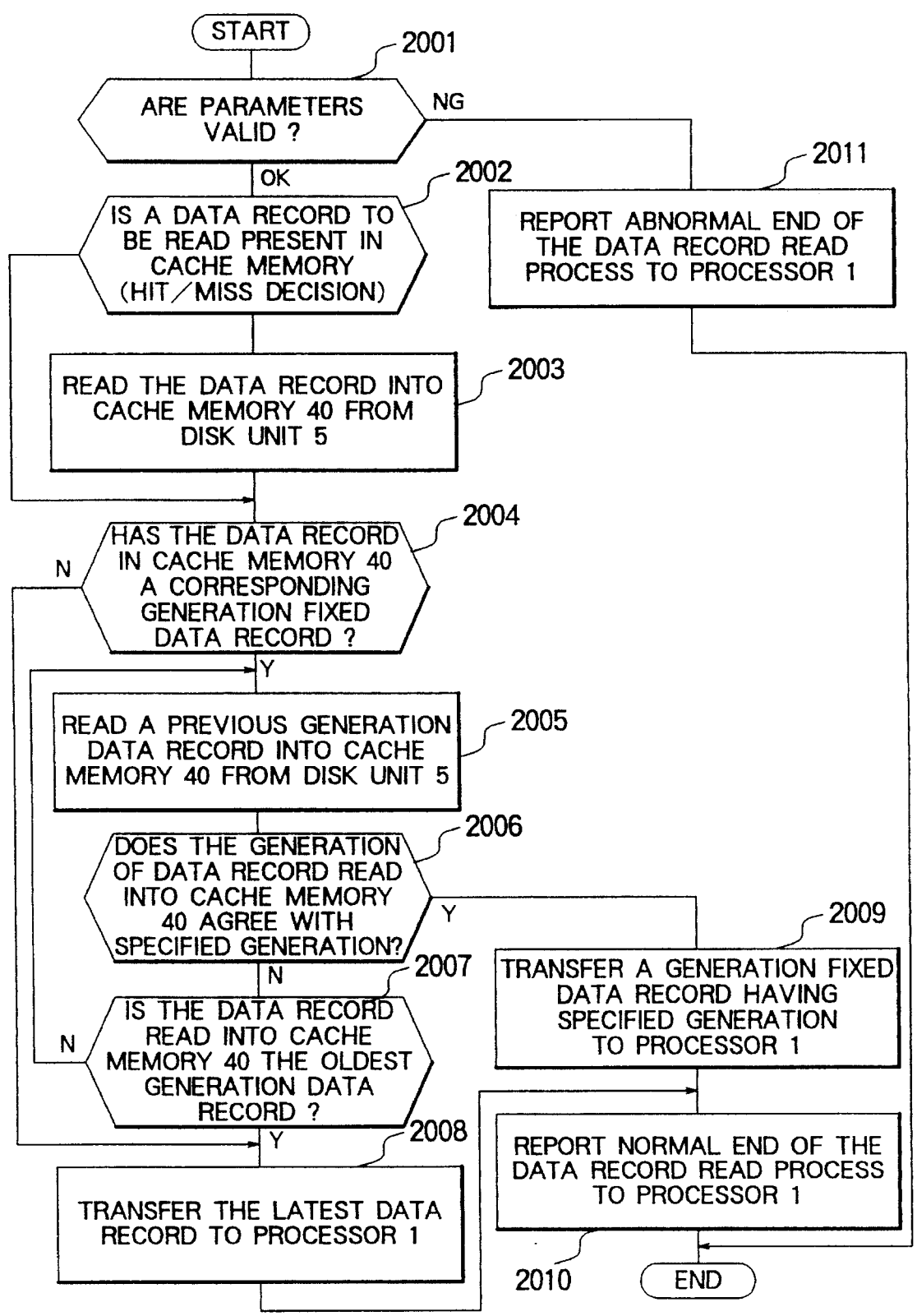
FIG. 23 is a flowchart of a generation fixed data record read process in the third embodiment.

FIG. 23 is a flowchart the data record read process in this embodiment. First, the validity of the address and generation of the data record is checked (step 2001), the address and generation being given as parameters in the generation fixed data record read request. If any contradiction is found in the parameters, an abnormal end of the data record read process is reported to the processor 1, with which the process is terminated. When the validity of the parameters is confirmed at step 2001, a decision is made whether or not a data record at an address specified by the parameter exists in the cache memory (step 2002). In consequence, if a decision is that the data record to be read does not exist in the cache memory, this data record is read into the cache memory from the disk unit (step 2003). Subsequently, a decision is made whether or not the data record as a candidate for processing in the cache memory has a corresponding generation fixed data record (step 2004). This decision is carried out by deciding whether or not the storage address of a previous generation fixed data address is set in the SCB 3165 or the ID field 903. If the decision is that there is a previous generation data record, the previous generation data record is read into the cache memory 40 from the disk unit 5 (step 2005). A decision is made whether or not the generation of the data record read out agrees with the specified generation (step 2006). In this decision, if it is decided that the generation of the generation fixed data record read into the cache memory 40 at step 2005 is not the generation specified by the parameter, subsequently a decision is made whether or not this generation fixed data record is the oldest generation data record (step 2007). If the decision is that the generation fixed data record read into the cache memory 40 at step 2005 is the oldest generation fixed data record, this means that the data record has not been updated since a generation fixed request of a specified generation is received. Therefore, in this case, the latest data record, that is, the data record specified by the address specified the parameter is transferred to the processor 1 (step 2008). If the decision at step 2007 is that there exists a generation fixed data record of a still older generation, the process returns to step 2005 where a previous generation fixed data record is read and the other necessary step is repeated. If a generation fixed data record of the specified generation is found at step 2006, this data record is transferred to the processor 1 (step 2009). After the data record is transferred to the processor 1 at step 2008 or 2009, a normal end of the data record read process is reported, with which the process is completed (step 2010).

According to this embodiment, a generation data record is saved in a free space in the disk unit as the occasion arises, and therefore in contrast to the second embodiment, it is possible to hold data records at the time when the dump process starts while making effective use of the cache memory.

In the third embodiment, the effective use of the cache memory can be achieved by storing generation fixed data records in the disk unit 5, but the same object can be attained by another method. To show one such example, description will now be made of a method of limiting the cache memory capacity which is used for data records of each generation specified by the processor 1. The greater part of a fourth embodiment is common with the second embodiment. Hence, the parts of the fourth embodiment which are different from the second embodiment will chiefly be described.

In this embodiment, in order to define the capacities of the cache memory used for different generations, a field for entering the usable capacity of the cache memory is provided for each entry of the generation control table 312. FIG. 24 shows the composition of the generation control table 312 used in this fourth embodiment. In FIG. 24, the capacity of the cache memory available for each generation is entered in the field 3128. The fields other than the field 3128 are exactly the same as in the second embodiment.

Figure 25:
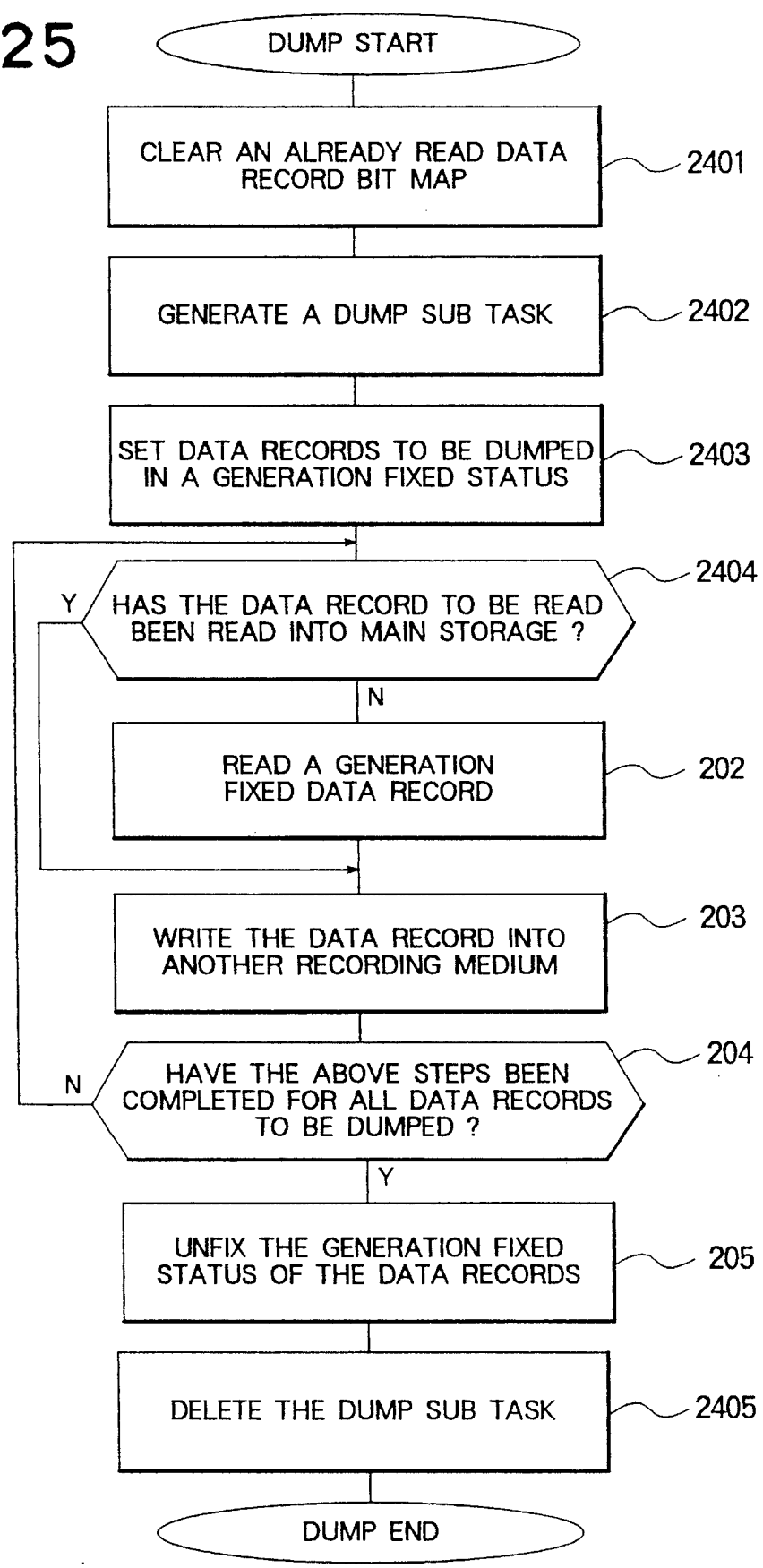
FIG. 25 is a flowchart of a process by a main task of a dump program in the fourth embodiment.

The dump program which runs on the processor 1 is of a multi-task structure having a plurality of tasks which can operate concurrently. To be more specific, as has been described with reference to some embodiments, the task structure comprises a main task for reading data records, included in the range of data records to be dumped, sequentially from the storage controller 3 and a sub task for reading a generation fixed data record from the cache memory. FIG. 25 is a flowchart of the main task of the dump program 12. The main task of the dump program 12, before starting the dump program, clears the already read data record bit map in the main storage (step 2401). The already read data record bit map is used to recognize data records read out from the storage controller 3 by a dump sub task to be described later. Though not shown diagrammatically, the already read data record bit map has bits corresponding to the individual data records to be dumped. When the data records are read out by the dump sub task, the corresponding bits are set. After step 2401, a dump sub task is generated (step 2402). To set the data records within a specified range subject to the dump process in a generation fixed status, the processor 1 issues a generation fix request to the storage controller 3 (step 2403). In this case, the generation fix request includes as parameters a generation number, the addresses of the leading and trailing data records to be set in a generation fixed status, and the capacity of the cache memory used for storing generation fixed data records. After setting the data records subject to the dump process in a generation fixed status, the processor 1 reads the data records subject to the dump process from the storage controller 3, and writes into the tape unit 7. To be more specific, a check is made whether or not the data record to be read out has been read into the main storage 17 (step 2404). This check is carried out by referring to the already read data record bit map in the main storage 17. If the decision by this check is that the data record to be read out has not been read into the main storage 17, this data record is read out (step 202). Step 202 is carried out by issuing a generation fixed data record read request to the storage controller 3. If the decision at step 2404 is that the data record to be read out has already been read into the main storage 17, step 202 is skipped. The data record read into the main storage 17 at step 202 or by a dump task is read into the take unit 7 (step 203). At step 204, a decision is made whether or not the steps mentioned above have been completed on all data records to be dumped. If it is decided that the dump process has been completed, the generation fixed status of the data records in the range subject to the dump process is unfixed (step 205), and the dump sub task is deleted (step 2405).

Figure 26:
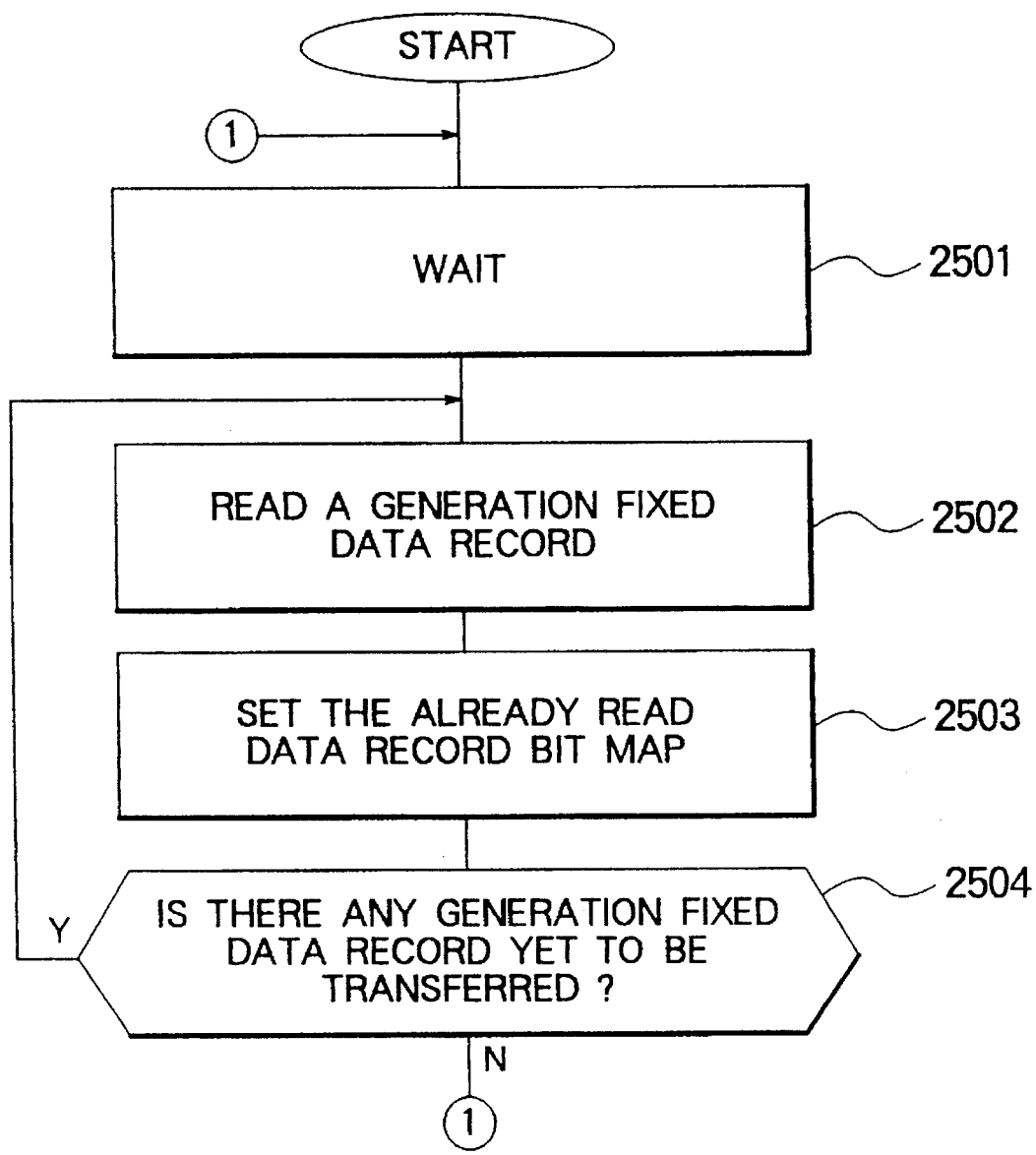
FIG. 26 is a flowchart of a process by a dump sub task in the fourth embodiment.

FIG. 26 is a flowchart of the steps by a dump sub task generated at step 2402. A dump sub task, after generated, is immediately placed in the WAIT status (step 2501). This WAIT status is reset when the processor 1 receives from the storage controller 3 a status report that the cache memory for storing generation fixed data records is full. If the WAIT status is reset by receiving the status report from the storage controller 3, then to read a generation fixed data record from the cache memory, the processor 1 issues a generation fixed data record read request to the storage controller 3 (step 2502). The generation fixed data record read request includes a generation as a parameter. When receiving this read request, the storage controller 3 transfers the generation fixed data record to the processor 1 from the cache memory 40 according to the specified generation, and issues a report on whether or not any generation fixed data record of the same generation is present in the cache memory besides the data record transferred. When receiving the generation fixed data record from the storage 3, the processor 1 stores it in the main storage 17. The processor 1 then records the location (cylinder number, track number, etc.) of the data record, which was read out, in the already read data record bit map (step 2503). After the already read data record bit map is set, a decision is made whether there is a generation fixed data record yet to be transferred (step 2504). This decision is carried out by deciding if at step 2502 a report that there is no generation fixed data record was sent from the storage controller 3 along with the data record. If the decision is that there is any other generation fixed data records yet to be transferred, the process returns to step 2502 to read another generation fixed data record, and this step is repeated. On the other hand, if at step 2504 the decision is that there is no generation fixed data record yet to be transferred, the process returns to step 2501, and the dump sub task is placed in the WAIT status. The dump sub task is deleted at step 2405 of the main task in the dump program 12.

The flow of the process steps of the dump program 12 which runs on the processor 1 has been described, and now the process steps on the storage controller 3 will be described.

Figure 27:
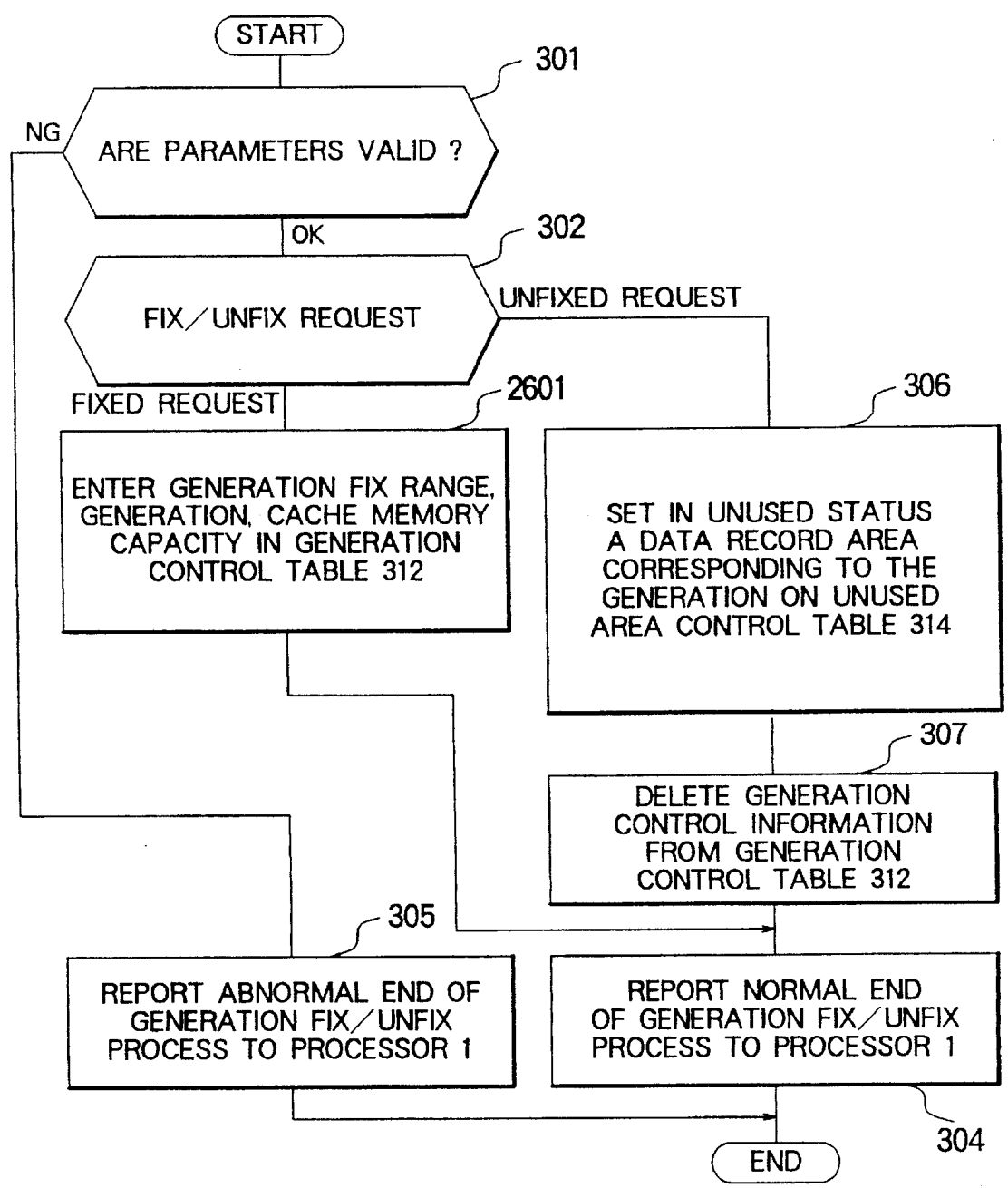
FIG. 27 is a flowchart of a generation fix/unfix process in the fourth embodiment.

When receiving a generation fix request issued at step 2403 from the dump program 12, the storage controller 3 executes the generation fix/unfix process 33. The generation fix/unfix process 33 in this embodiment is almost the same as the generation fix/unfix process in other embodiments as shown in FIG. 7. Only difference of the generation fix/unfix process shown in FIG. 27 in the fourth embodiment from that shown in FIG. 7 is step 2601 executed instead of step 303 in FIG. 7. At step 2601, the capacity of the cache memory, which is a newly added parameter in this fourth embodiment, is set in the generation control table 312 in addition to a disk number, host number, generation number, a range of data records to be set in a generation fixed status, and a date. The steps other than step 2601 are the same as shown in FIG. 7, and therefore their descriptions will not be repeated here. The data record update process 36 in this fourth embodiment proceeds as in that of the second embodiment shown in FIG. 18. In this embodiment, however, a cache memory area for storing generation fixed data records is defined, so that the data record copy process 37 executed at step 1406 in FIG. 18 differs from the copy process in the second embodiment. Description will next be made of the data record copy process of the fourth embodiment, which differs from that in the second embodiment.

Figure 28:
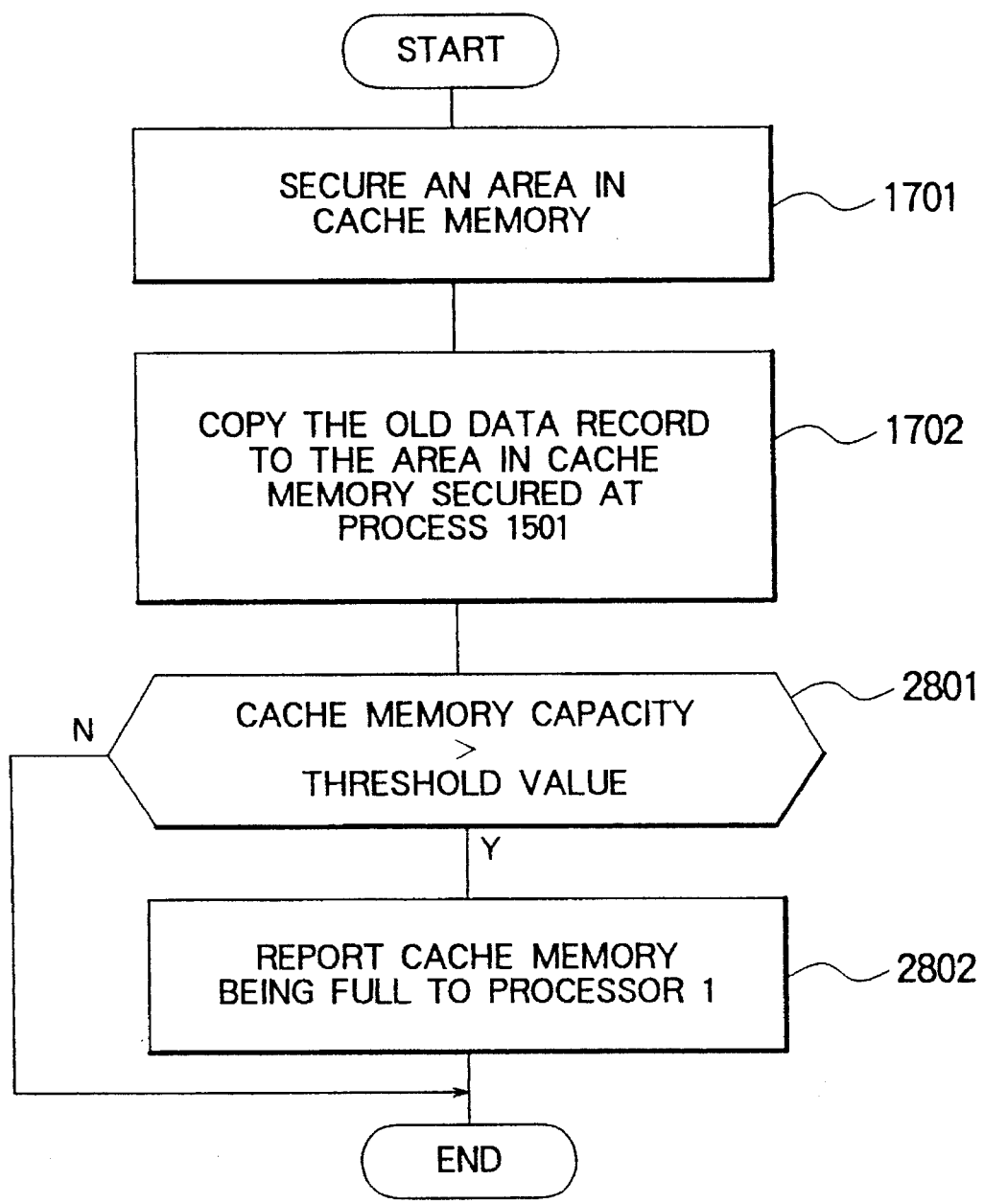
FIG. 28 is a flowchart of a data record copy process in the fourth embodiment.

FIG. 28 is a flowchart of the data record copy process executed in this embodiment. At steps 1701, 1702, like in the second embodiment (in FIG. 19), an area is secured in the cache memory 40, and the before-update value of the data record to be updated is copied to that area. Thereafter, a decision is made whether or not the cache memory area used to store generation fixed data records is greater than a threshold value (step 2801). The threshold value used for this decision is decided according to the cache memory capacity set in the field 3128 of an entry in the generation control table 312 which has the generation specified by the generation fix process request. In this embodiment, 80 percent of the cache memory capacity set in the field 3128 is used as the threshold value. If the decision at step 2801 is that the cache memory capacity for storing generation fixed data records exceeds the threshold value, the cache memory being full is reported to the processor 1 by generating an interrupt (step 2802). When this interrupt is reported to the processor 1, as described above, the dump sub task is started so as to read a generation fixed data record from the cache memory. If in this report a generation number for which the cache memory capacity has exceeded the threshold value is reported to the processor 1 and only the generation fixed data records having the generation number which has been reported by the dump sub task are read out, it is possible to prevent the processing load on the processor 1 from increasing excessively and make effective use of the cache memory. If the decision at step 2801 is that the cache memory capacity for storing generation fixed data records does not exceed the threshold value, the process is brought to a normal end. By this arrangement, the capacity for generation fixed data records can be limited, which is generated in the cache memory in response to a data record update request issued from the online program 14.

Figure 29:
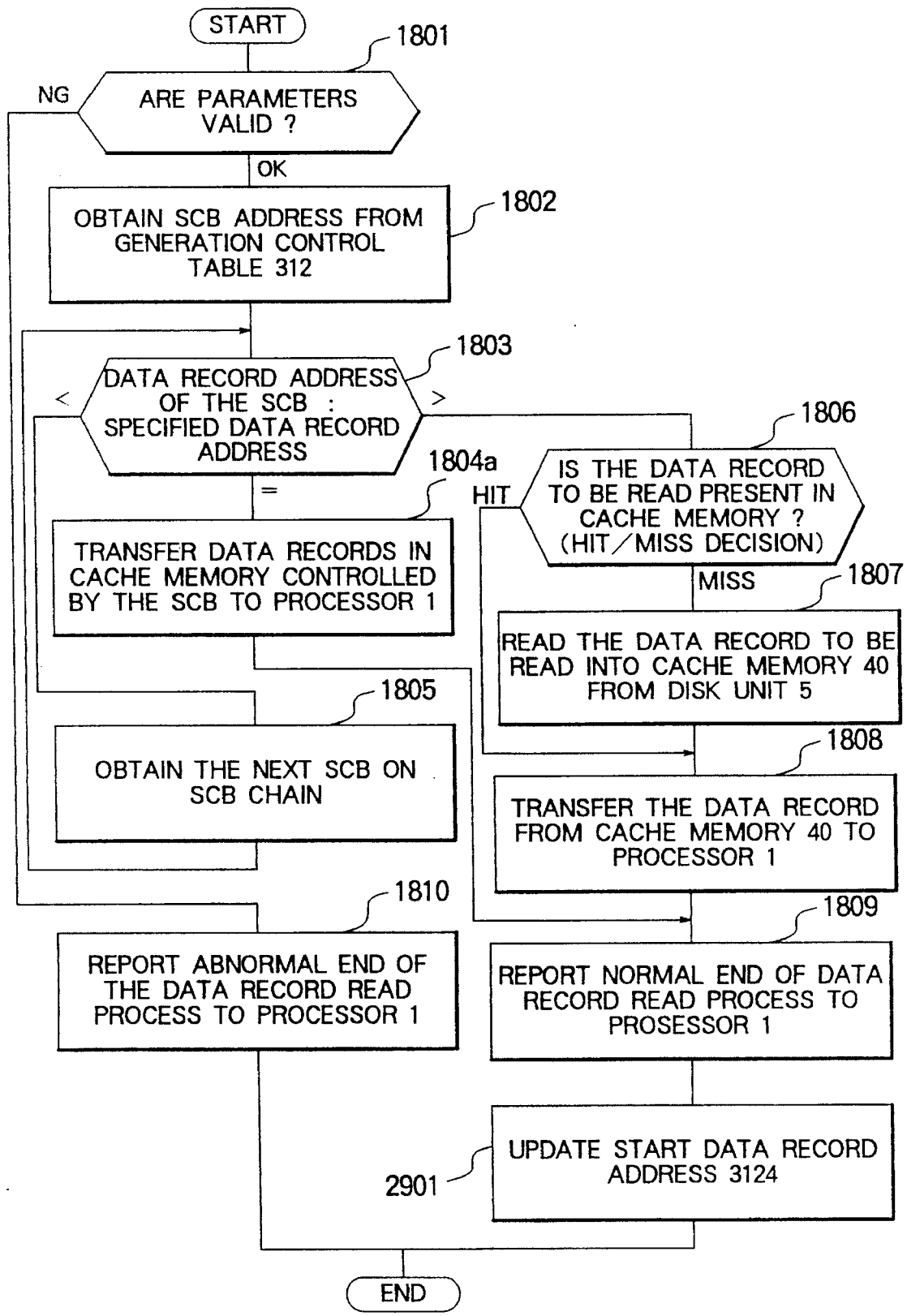
FIG. 29 is a flowchart of a generation fixed data record read process in the fourth embodiment.

FIG. 29 is a flowchart of the steps executed by the generation fixed data record read process 34 in response to a generation fixed data record read request issued by the main task of the sump program 12. The process executed in response to a generation fixed data record read request in this embodiment proceeds almost in the same way as in the generation fixed data record read process in the second embodiment shown in FIG. 20, but there are two different points as follows:

At step 1804a in FIG. 29, after all generation fixed data records controlled by the SCB as the target of processing like at step 1804 in FIG. 20 are transferred to the processor 1, and a subsequent processing is performed. To be more concrete, when the data records transferred are generation fixed data records, the SCB as the target of processing is deleted. With this additional processing, the dump process is finished. By deleting the generation fixed data records that have become unnecessary from the cache memory, a wasteful occupation of the cache memory area can be avoided.

After the end of the process is reported to the processor 1 at step 1809, there is an added step 2901 for storing in the start data record address field 3124 of the generation control table 312 the next data record address subsequent to the data records, which were to be dumped and have been transferred. By the processing at step 1901, it is possible to narrow the range of data records as candidates for being set in a generation fixed status according to the progress of the dump process, and avoid the execution of the wasteful generation fix process and the wasteful use of the cache memory.

Figure 30:
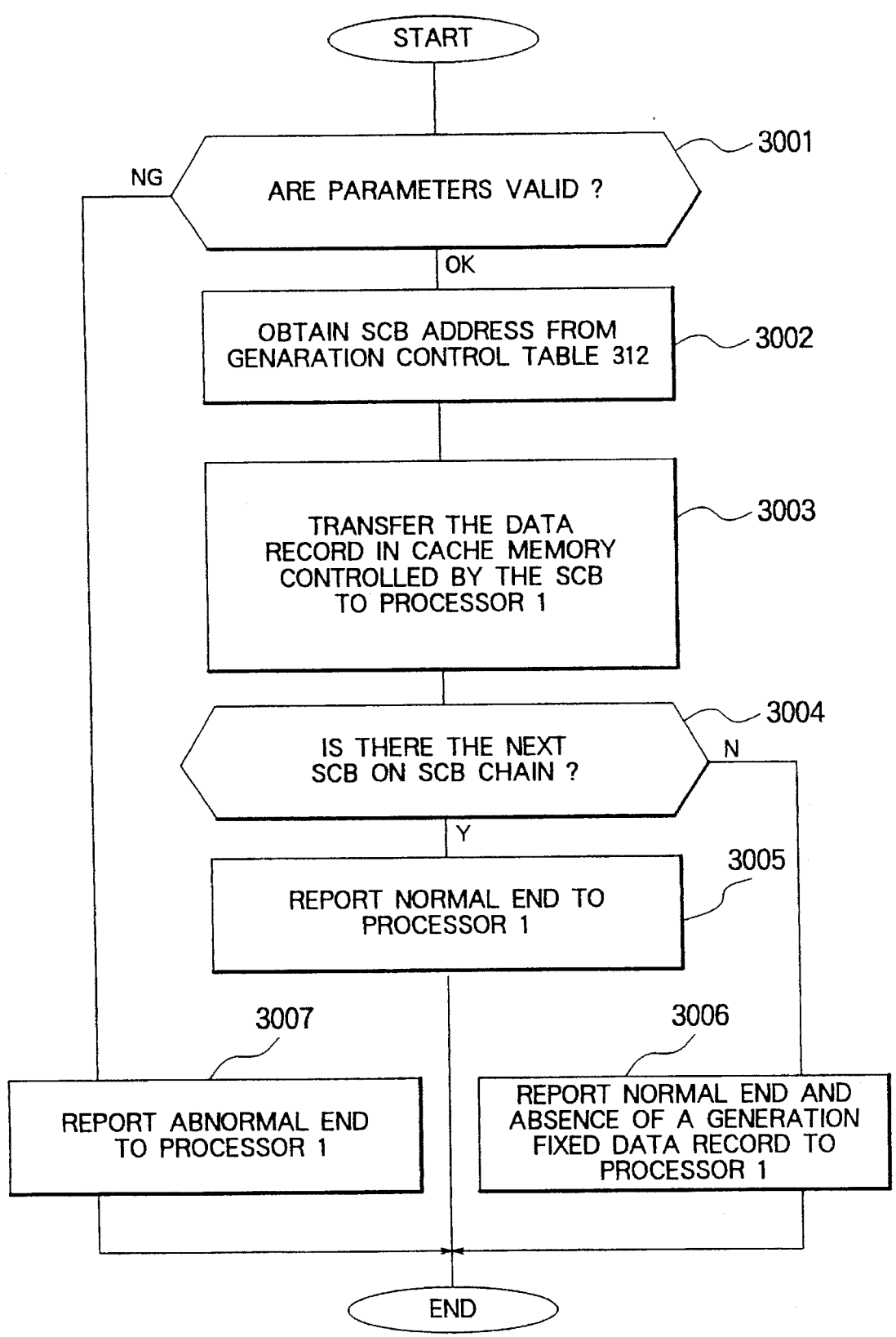
FIG. 30 is a flowchart of a sub-task generation fixed data record read process.

In addition to the above-mentioned main-task process executed in response to a generation fixed data record read request, in the generation fixed data record read process 34 in this embodiment, there is another sub-task generation fixed data record read process executed in response to a sub-task generation fixed data record read request issued by the dump sub task on the processor 1. FIG. 30 is a flowchart of the sub-task generation fixed data record read process.

In the sub-task generation fixed data record read process, the validity of the parameters given in a sub-task generation fixed data record read request is checked (step 3001). To be more specific, this check is carried out by deciding whether or not the generation specified by the parameter has been entered in the generation control table 312. If the specified generation has not been entered in the generation control table 312, a decision is made that the input parameter is invalid, the process proceeds to step 3007 where an abnormal end of the process is reported to the processor 1. On the other hand, if the specified generation has been entered in the generation control table 312, the process proceeds to step 3002. At step 3002, refer to the generation control table 312, and from the SCB pointer field 3127 at an entry corresponding to the specified generation, obtain the address of the SCB 3165 for controlling the area in the cache memory, which stores a data record fixed by the specified generation. Subsequently, the data record in the cache memory controlled by the SCB indicated by the SCB address obtained at step 3002 is transferred to the processor 1, and the SCB controlling the data record which has been transferred is deleted (step 3003). Data records in the area of the cache memory are transferred collectively to the processor 1, which processing has some analogy to data transfer in the tracks of the disk unit 5. After the generation fixed data records in the cache memory have been transferred to the processor 1, a decision is made whether or not there is any other generation fixed data record having the same generation in the cache memory, which has not been transferred to the processor 1 (step 3004). This decision is carried out by deciding whether or not an SCB address has been set in the SCB pointer field by referring to the generation control table 312. If the decision is that a generation fixed data record having the specified generation still exists in the cache memory 40, a normal end of the sub-task generation fixed data record read process to the processor 1 (step 3005). If the decision at step 3004 is that no generation fixed data record to be read out exists in the cache memory 40, in addition to the report about the normal end of the sub-task generation fixed data record read process, the absence of a generation fixed data record to be transferred is reported to the processor 1 (step 3006).

In the embodiment described above, it is possible to limit the cache memory capacity required to store generation fixed data records without having to store the generation fixed data records on the disk unit. Therefore, even while the dump process is under way, a high cache hit ratio can be guaranteed when access to a desired data record is requested by the online program 14, and the data records existing at the start time of the dump process can be read securely.

As has been described, according to the present invention, when an update request is issued while the dump process is in progress, old data records are saved in a specified storage area and then the update process is performed, so that the data records the moment the dump process is started as requested by the dump program can be obtained. Therefore, even when the dump process is executed concurrently with another process, complete information to be dumped existing at the start time of dumping can be collected.

We claim:

1. A storage controller connected between a processing unit and a storage device storing a plurality of data records for controlling the storage device, comprising:

a generation fixing means for setting a specified range of data records in a generation fixed status by storing range information indicating a specified range of data records, and a generation identifier associated with the range information for uniquely identifying a data record generation in response to a data record generation fix request received from said processing unit, said data record generation fix request specifying a range of data records to be set in a generation fixed status;

a deciding means for deciding whether or not a data record to be updated in an update request is in a generation fixed status by referring to said generation fixing means in response to a data record update request received from said processing unit;

an old data record copying means for copying said data record to be updated to an unused area of said storage device by associating said data record to be updated with said generation identifier when said deciding means decides that said data record to be updated is in the generation fixed status; and means for storing in said storage device the data record transferred from said processing unit in compliance with said data record update request.

2. A storage controller according to claim 1, wherein said storage controller is connected to another storage device other than said storage device, and wherein said old data record copying means copies the data record to be updated to said other storage device instead of the unused area of said storage device.

3. A storage controller according to claim 1, further comprising:

a generation comparing means for comparing the generation identifier associated with a data record to be read out with a generation identifier specified in a data record read request in response to a data record read request received from said processing unit; and means for reading one of said data records satisfying said read request in response to a comparison result of said generation comparing means.

4. A storage controller according to claim 1, further comprising:

means for unfixing the generation fixed status of the specified range of data records in response to a data record generation unfix request received from said processing unit, and for specifying one of said generation identifiers associated with the data record generation to be unfixed by deleting range information associated with the one generation identifier; and means for freeing a storage area that stores the specified range of data records in the generation fixed status in accordance with said one generation identifier.

5. A storage controller according to claim 1, wherein said storage device controlled by said storage controller is a disk array storage in which one or more parity records generated from a plurality of data records and said plurality of data records are respectively stored in independent disk units.

6. A storage controller according to claim 1, wherein said old data record copying means performs a copying process on a data record yet to be copied in response to a data record copy request.

7. A storage controller connected between a processing unit and a storage device storing a plurality of data records for controlling the storage device, and having a cache memory for storing duplicates of some of data records in said storage device, said storage controller comprising:

a generation fixing means for setting a specified range of data records in a generation fixed status by storing range information indicating a specified range of data records, and a generation identifier associated with the range information for uniquely identifying a data record generation in response to a data record generation fix request received from said processing unit, said data record generation fix request specifying a range of data records to be set in a generation fixed status;

a deciding means for deciding whether or not a data record to be updated in an update request is in a generation fixed status by referring to said generation fixing means in response to a data record update request received from said processing unit;

an old data record copying means for copying said data record to be updated to said cache memory by associating said data record to be updated with said generation identifier when said deciding means decides that said data record to be updated is in the generation fixed status;

a first storing means for storing the data record transferred in compliance with said data record update request into said storage device.

8. A storage controller according to claim 7, further comprising a second storing means for storing in the unused area of said storage device the old data record associated with the generation on said cache memory.

9. A storage controller according to claim 7, wherein said storage controller is connected to another storage device other than said storage device, and wherein said storage controller further comprises a second storing means for storing said old data record associated with the generation on said cache memory in said other storage device.

10. A storage controller according to claim 7, further comprising:

a generation comparing means for comparing the generation identifier associated with a data record to be read out with a generation identifier specified in a data record read request in response to an external data record read request; and means for reading one of said data records satisfying said read request in response to a comparison result of said generation comparing means.

11. A storage controller according to claim 7, further comprising:

means for unfixing the generation fixed status of the specified range of data records in response to an external data record generation unfix request received from said processing unit specifying one of said generation identifiers associated with the data record generation to be unfixed; and means for freeing a storage area that stores the specified range of data records in the generation fixed status in response to said one generation identifier.

12. A storage controller according to claim 7, wherein said storage device controlled by said storage controller is a disk array storage in which one or more parity records generated from a plurality of data records and said plurality of data records are respectively stored in independent disk units.

13. A storage controller according to claim 7, wherein said old data record copying means performs a copying process on a data record yet to be copied in response to a data record copy request.

14. A dump process for saving data records stored in a first storage device into a second storage device, comprising the steps of:

before the dump process, requesting a storage controller controlling the first storage device to set data records to be dumped in a generation fixed status by storing range information indicating a specified range of data records and a generation identifier associated with the range information;

saving in an arbitrary storage area an old data record of the data record to be updated when an update request is made on the data record to be dumped after the data records to be dumped have been set in the generation fixed status;

out of the data records to be dumped on the first storage device which have been set in the generation fixed status before the dump process, reading the data records for which no update request has been made, and the old data record saved in the arbitrary storage area in response to said update request, and storing the data records, which have been read out, into the second storage device; and unfixing the generation fixed status of the data records at the end of the dump process.

15. For use in a computer system including a processor, a first storage device storing data records used by said processor, a storage controller for controlling said first storage device, and a second storage device for storing copies of the data records at a given point in time, which are stored in said first storage device, a data record control method, which is executed by said storage controller, comprising the steps of:

receiving from said processor a specification of a range of data records, which are stored in the first storage device and which are to be copied to the second storage device;

checking whether or not a data record to be updated is included in the specified range of data records by said specification in response to a data record update request issued from said processor;

if the result of the above check shows that the data record to be updated is included in said range, storing a data record with a before-update value of the data record to be updated in a predetermined storing means;

in response to a read request issued from said processor to obtain said copies, deciding whether or not a data record with a before-update value corresponding to the data record specified by said read request is present in said storing means; and if a decision is that there is said data record with said before-update value, transferring the data record to said processor.

16. A data record control method according to claim 15, wherein said specification of the range includes a generation identifier for specifying a point in time when said specification is given, and said receiving step includes a step of storing the data record by associating said range with said generation identifier.

17. A data record control method according to claim 16, wherein said storing step includes a step of associating the data records with before-update values with said generation identifier.

18. A data record control method according to claim 17, wherein said read request includes said generation identifier included in the specification of said range, and said deciding step is carried out by using said generation identifier.

19. A storage controller in a computer system having a host computer, a first storage device storing a plurality of data record, and a second storage device for storing copies of said plurality of data record, said storage controller connected between said host computer and said first storage device and comprising:

a generation control table for storing generation fixing information including range information indicating a range of data records in a generation fixed status;

a generation fixing means for receiving, from said host computer, a generation fix request designating a range of data records to be set in generation fixed status, and for registering the range of data records designated by the generation fix request into said generation control table as said range information;

a deciding means for deciding, in response to an update request, issued from said host computer, having designation of a data record to be updated, whether or not the data record to be updated is included in a range of data records which is indicated by said range information registered in said generation control table;

a data updating means for updating the data record to be updated, said data updating means having copying means for copying old contents of the data record to be updated into an unused area of said first storage device before updating the data record to be updated when said deciding means decides that the data record to be updated is included in a range of data records indicated by said range information registered in said generation control table; and a data transfer means for transferring, in response to data record read request having designation of a data record to be read and being issued by said host computer for copying the data record to be read into said second storage device, contents of the data record to be read to said host computer, said data transfer means having means for determining whether or not old contents of the data record to be read exists, and for transferring the old contents of the data record to be read instead of the contents of the data record to be read when said determining means determines that the old contents of said data record to be read exists.

20. A storage controller according to claim 19, wherein said generation fix request having designation of generation identifier identifying generation of the generation fix request, and wherein said generation fixing means registers said generation identifier into said generation control table with associating said generation identifier with said range of data record.

21. A storage controller according to claim 20, wherein said copying means of said updating means copies said old contents of the data record to be updated to said unused area with associating said old contents of the data record to be updated with generation identifier associated with data records which includes the data record to be updated.

22. A storage controller according to claim 21, wherein said data record read request includes designation of a generation identifier, and wherein said data transfer means transfers old contents of said data record to be read associated with the generation identifier designated by the data record read request.

23. A storage controller according to claim 22, further comprising:

unfixing means for deleting, in response to a generation unfix request having designation of a generation identifier, the generation fixing information associated with the generation identifier designated by said generation unfix request from said generation control table; and means for freeing a storage area storing old contents of data records in the generation fixed status associated with the generation identifier designated by said generation unfix request.

24. A storage controller according to claim 19, wherein said range information includes data record address of a first data record in the range of data record and end data record address of a last data record in the range of data record.

* * * * *